United States Patent
Weisser et al.

(10) Patent No.: US 7,546,396 B2
(45) Date of Patent: Jun. 9, 2009

(54) INTERFACE SYSTEM

(75) Inventors: Pirmin Weisser, VS-Villingen (DE); Michael Maier, VS-Schwenningen (DE); Rudiger Gausmann, St. Georgen (DE)

(73) Assignee: Harman Becker Automotive Systems GmbH (DE)

( * ) Notice: Subject to any disclaimer, the term of this patent is extended or adjusted under 35 U.S.C. 154(b) by 341 days.

(21) Appl. No.: 11/061,761

(22) Filed: Feb. 17, 2005

(65) Prior Publication Data
US 2006/0023574 A1 Feb. 2, 2006

(30) Foreign Application Priority Data
Feb. 18, 2004 (EP) .................................. 04003680

(51) Int. Cl.
*G06F 3/00* (2006.01)
(52) U.S. Cl. ........................................................ 710/36
(58) Field of Classification Search .................... 710/36
See application file for complete search history.

(56) References Cited
U.S. PATENT DOCUMENTS

| | | | | |
|---|---|---|---|---|
| 4,371,932 A * | 2/1983 | Dinwiddie et al. | ............ | 710/21 |
| 4,803,618 A * | 2/1989 | Ita et al. | ...................... | 711/147 |
| 4,980,818 A | 12/1990 | Shinmura | | |
| 5,353,428 A * | 10/1994 | Shibata | ........................ | 711/145 |
| 5,701,450 A * | 12/1997 | Duncan | ...................... | 712/245 |
| 6,192,433 B1 | 2/2001 | Chan et al. | | |
| 6,289,369 B1 * | 9/2001 | Sundaresan | .................. | 718/103 |
| 6,549,966 B1 | 4/2003 | Dickens et al. | | |
| 2003/0237053 A1 * | 12/2003 | Chen et al. | .................. | 715/514 |

OTHER PUBLICATIONS

"Serial ATA II: Port Selector", Revision 1.0, dated Jul. 28, 2003, XP002286551, obtained on Jun. 30, 2004 from the Internet: <URL:http://www.serialata.org/collateral/pdf/ps_100_Gold.pdf, 17 pages.
European Search Report for EP Application No. 04 00 3680, dated Jul. 26, 2004, 2 pages.

* cited by examiner

*Primary Examiner*—Henry W. H. Tsai
*Assistant Examiner*—Juanito C Borromeo
(74) *Attorney, Agent, or Firm*—Brinks Hofer Gilson & Lione

(57) ABSTRACT

A data transfer interface is provided which enables a plurality of data processing devices to access a single data storage drive. The data processing device includes a switch connected to the plurality of data processing devices and the data storage drive. A control device drives the switch so that only one of the data processing devices accesses the data storage drive at a time.

33 Claims, 21 Drawing Sheets

INTERFACE SYSTEM

BACKGROUND OF THE INVENTION

1. Priority Claim

Other computer systems may include an auxiliary storage drive. For instance, a first processor may provide system control and user interface functionalities of the information and/or entertainment system. In addition, this processor may execute car navigation software. The first storage drive may include, for example, a DVD drive. The DVD drive may be used to supply navigation information such as road maps, or software updates from DVD media. A second storage drive may include an additional DVD drive. A second processor may be capable of accessing and decoding DVD video data from a DVD disk inserted into the additional DVD drive.

2. Technical Field

The invention relates to an interface system for use with an information and/or entertainment system. The invention relates to a data transfer interface for enabling a plurality of data processing devices to access a single data storage drive.

3. Related Art

Computer systems, such as personal computers and office computers, often include a single processor. The single processor may have access to one or a plurality of storage drives. When computer systems are used as a multi-media system, the processor may need to provide a high processing performance for video decoding, sound decoding, etc. Therefore, personal computer based multi-media systems may require high performance processors. Consumer devices, such as a vehicle information and/or entertainment system, may have a processor having a comparably low computing power, to reduce the production cost. The consumer device may have auxiliary processors to perform specialized computing and processing such as video decoding.

The consumer device may have drawbacks that data required by the auxiliary processors must be retrieved from the storage drive and forwarded by the main processor. Accordingly, high processing loads may be imposed on the main processor to provide data to the auxiliary processor. The processing resources of the main processor may be insufficient to perform multitasking operations such as system control operations and navigation data processing to provide navigation and the like. For example, if the auxiliary processor decodes video data, the main processor may have to retrieve and forward a large amount of video data. While performing such processing, the main processor may use large portions of processing resources. In addition, data required by the auxiliary processor may need to be stored within a file system having a complex structure. For instance, data on DVD (Digital Versatile Disc) video disks may be organized according to a file system structure with a predetermined hierarchy. Required data portions can only be properly accessible by a host capable of navigating this specific file structure. Accordingly, the main processor may need to be equipped with file system navigation capabilities corresponding to a file system structure of the data. The main processor with DVD video disk file navigation capabilities may require substantial developmental effort.

Other computer systems may include an auxiliary storage drive. For instance, a first processor may provide system control and user interface functionalities of the information and/or entertainment system. In addition, this processor may execute car navigation software. The first storage drive may include, for example, a DVD drive. The DVD drive may be used to supply navigation information such as road maps, or software updates from DVD media. A second storage drive may include an additional DVD drive. The second processor may be capable of accessing and decoding DVD video data from a DVD disk inserted into the additional DVD drive.

Two separate storage drives may render the system unsuitable for installation in a vehicle or in other applications having space restrictions. In addition, an information and/or entertainment system with two storage drives may result in increased hardware and production cost. Further, it may be difficult to operate the system because the drives provide different types of data. For instance, the first storage drive may accept a CD or DVD media, whereas the second storage drive may only accept DVD video disks.

The conventional systems fail to provide a system with an efficient access to a single data storage by a plurality of data processing devices. Therefore, a need exists for an improved interface system that overcomes at least some of the drawbacks of the conventional systems.

SUMMARY

This invention provides a data transfer interface system including a plurality of data processing devices having access to a single data storage drive. The system also includes a switch and a control device. The switch is configured to be connected to the plurality of data processing devices and the data storage drive. The control device is operable to drive the switch to permit one of the plurality of data processing devices to access the data storage drive at a time.

This invention further provides a method for enabling an access of a plurality of data processing devices to a single data storage drive. The method includes selecting one of the plurality of data processing devices and controlling the switch to connect the selected data processing device with the data storage drive. The method also includes providing only the selected data processing device with an access to the data storage drive.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A data transfer interface is provided that allows a plurality of data processing devices to access a single data storage drive. The plurality of data processing devices may include a main processor and an auxiliary processor. A switch may be provided to connect the plurality of data processing devices to the data storage drive. The main processor is not needed to provide the auxiliary processor with access to stored data. Both the main processor and the auxiliary processor can access the single data storage drive on their own. Therefore, processing resources of the main processor may be used efficiently.

Figure 1:
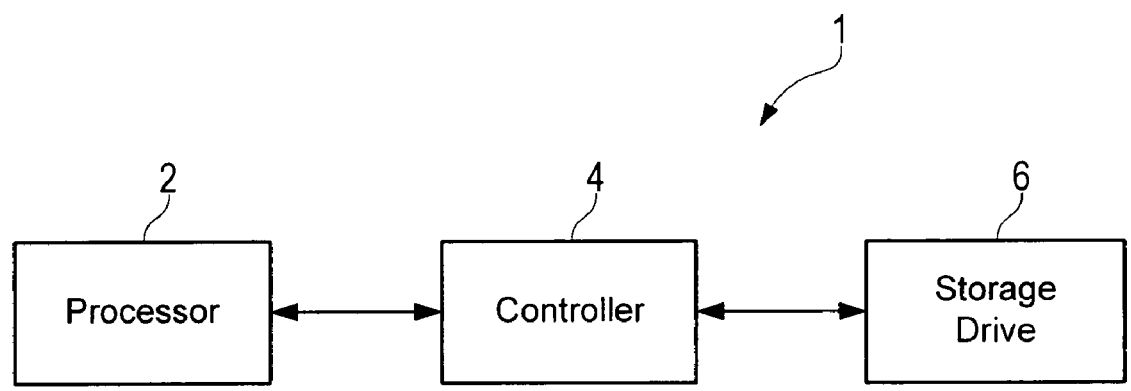
FIG. 1 is a block diagram of a conventional single processor computer system.

FIG. 1 illustrates a block diagram of a computer system 1 having a single processor 2. The processor 2 is provided for carrying out functions such as data processing and control. The computer system 1 is further equipped with a storage drive 6 and a controller 4 allowing the processor 2 to access the storage drive 6. The storage drive 6 may be, for example, a hard disk drive or an optical storage drive such as a DVD (Digital Versatile Disc) drive. The processor 2 and the controller 4 may be both connected to a common data bus. For example, internal data buses such as a PCI (Peripheral Component Interconnect) bus or an ISA (Industry Standard Architecture) bus may be used.

Figure 2:
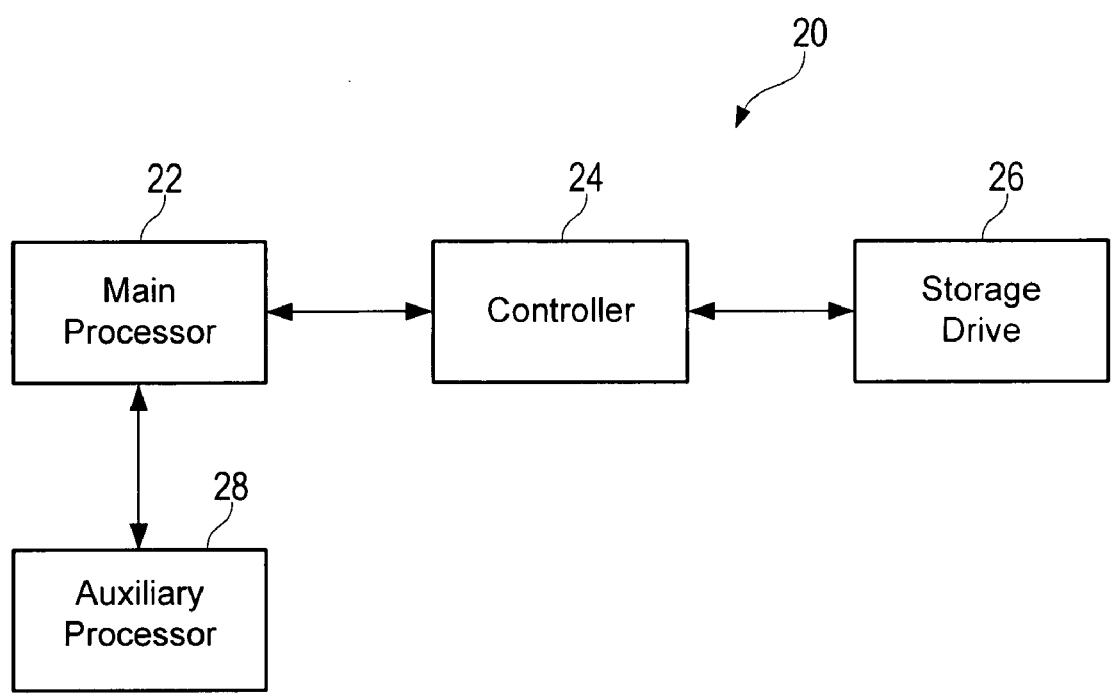
FIG. 2 is a block diagram of a conventional computer system having an auxiliary processor.

FIG. 2 illustrates configuration of a computer system 20 utilizing an auxiliary processor. The computer system 20 may include a main processor 22, a storage drive 26 and a controller 24 allowing the main processor 22 to access the storage drive 26. A common data bus of the computer system 20 may interconnect the main processor 22 and the controller 24. An auxiliary processor 28 may be connected to the main processor 22 and perform specific processing functions. The main processor 22 may supply the auxiliary processor 28 with data from the storage drive 26. The main processor 22 may carry out an access operation to obtain the required data from the storage drive 26. The main processor 22 may forward the obtained data to the auxiliary processor 28, which in turn processes the data.

Figure 3:
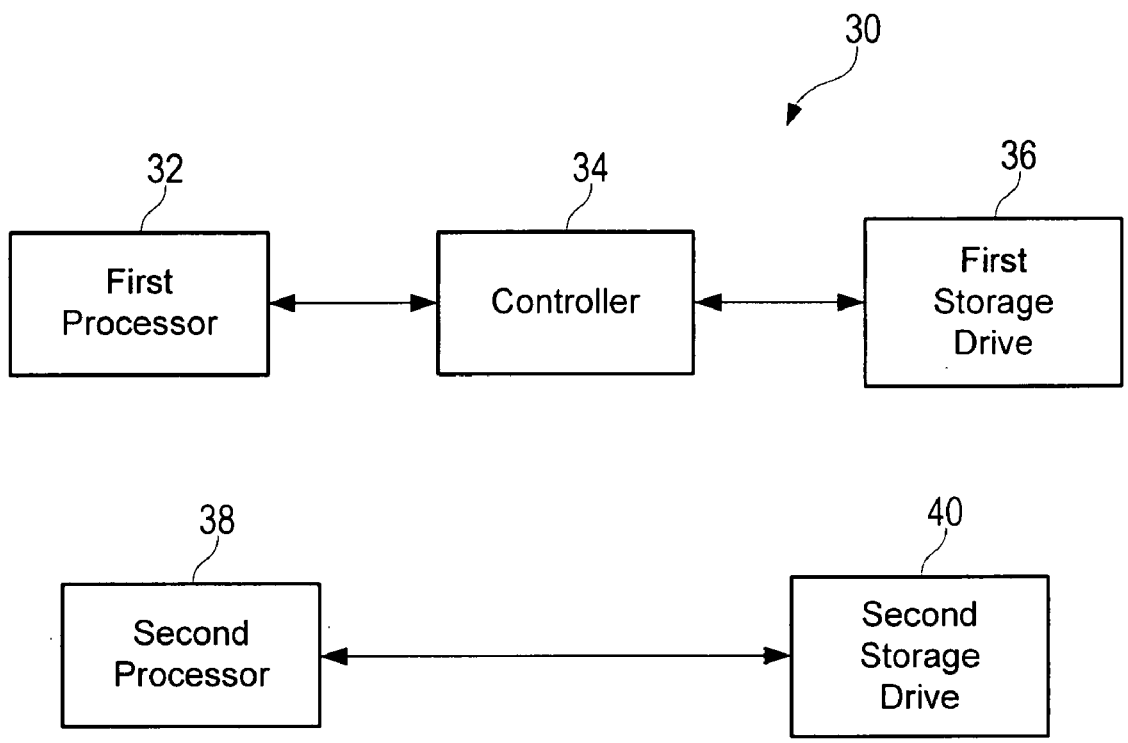
FIG. 3 is a block diagram of a conventional computer system with two processors and two separate storage drives.

FIG. 3 illustrates another conventional configuration of a computer system 30 including an auxiliary processor and an auxiliary storage drive. The computer system 30 may operate as an information and/or entertainment system and include two processors 32 and 38. Each processor performs specific tasks. The first processor 32 accesses a first storage drive 36 via a controller 34. Data required by the second processor 38 may be stored onto a separate additional storage drive 40. The second processor 38 may directly access the storage drive 40.

Figure 4:
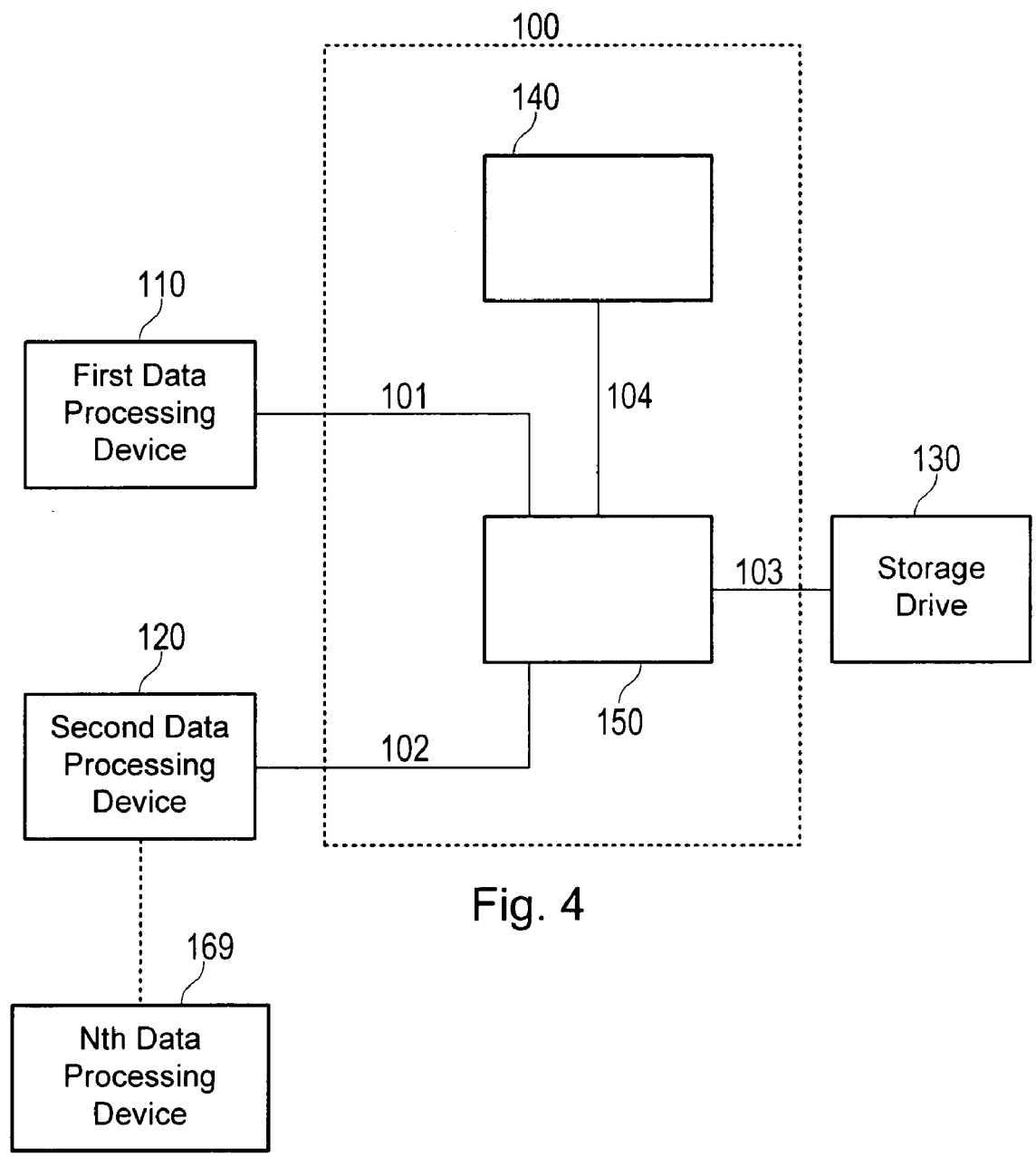
FIG. 4 is a block diagram of a first example of a data transfer interface.

FIG. 4 illustrates an exemplary configuration of a data transfer interface 100 for connecting N data processing devices 110, 120 and 160 to a shared storage drive 130. The data transfer interface 100 may include a switch 150. For convenience of discussion only, the first and second data processing devices 110 and 120 are described but other data processing devices may be included. The switch 150 allows the data processing devices 110 and 120 to access information from the data storage drive 130. A control device 140 may drive the switch 150 to have only one of the data processing devices 110 and 120 access the data storage drive 130 at a time. The switch 150 may enable or disable signal exchanges between the first and second data processing devices 110 and 120 and the data storage drive 130. Signal lines 101 and 102 may be connected to the switch 150. The switch 150 may be connected to the data storage drive 130 via a signal line 103. The data transfer interface 100 may enable access of the first and second data processing devices 110 and 120 to the single data storage drive 130. The data storage device 130 may include, for example, a hard disk, a semiconductor disk or an optical drive such as a CD drive and a DVD drive. An optical drive may provide data from different storage media in accordance with a respective operation to be performed by the data processing devices 110 and 120.

Various types of data processing devices may be connected to the data transfer interface 100 for accessing the data storage drive 130. The first and second data processing devices 110 and 120 may be a processing unit for general use such as a CPU (Central Processing Unit) of an embedded system and/or processing units for specific tasks, such as encoders, decoders or video processors. The first processing device 110 may perform control operations and obtain programs from a CD media or DVD media inserted into the data storage drive 130. The second data processing device 120 may access video data and decode the video data provided on the same or on another storage medium to be inserted into the storage drive 130. The first and second data processing devices 110 and 120 may include an interface connector having the same data bus standard as the data storage drive 130. The data storage drive 130 may include a standardized data bus interface, such as an ATA/ATAPI (Advanced Technology Attachment/Advanced Technology Attachment Packet Interface) interface. The data transfer interface 100 may also include a configuration such that the data processing devices and the data storage drive have different data bus interfaces. A data transfer interface to connect different bus interfaces will be described in conjunction with FIG. 6.

At least one of the first and second data processing devices 110 and 120 may include an interface in accordance with an ATA/ATAPI standard. The ATA/ATAPI standard may support connections of data storage drives to computer systems such as personal computers. A data transfer between a host computer and an ATAPI storage drive may involve a set of registers. Both the ATAPI storage drive and the host computer may use the set of registers. These registers may include a data register, a position register and a command register. An ATA/ATAPI data bus may include a plurality of signal lines connecting a host device such as a computer system and a data storage drive. Address signal lines may address one of the registers, data signal lines may transfer data to/from a respective register, and control signal lines may control reading and writing of data. The set of registers may be named as a task file. The ATAPI storage drive may require device-specific control information such as a sector, a cylinder number and/or a head ID to search for position information of a read/write head. This information may be individually transferred and written into a register of the ATAPI storage drive.

A communication session with a storage drive using the ATA/ATAPI standard may be carried out in several phases including a command phase and a data phase. The host computer may write a command to a command register on the storage drive during the command phase. Position information and commands may be written onto a respective register on the storage drive, to initiate data transfer. In a next phase, data may be transferred from/to the data storage drive in accordance with the transferred command.

The first data processing device 110 or the second data processing device 120 may directly address the storage drive 130 via the data transfer interface 100. When the data transfer interface 100 is used to have access to the data storage drive 130 in accordance with the ATA/ATAPI standard, the first and second data processing devices 110 and 120 also may include a bus interface in accordance with the ATA/ATAPI standard. Exchanged signals between the data storage drive 130 and one of the first and second data processing devices 110 and 120 may be transmitted via the data transfer interface 100 without the conversion.

Alternatively, or additionally, the data transfer interface 100 may include an ATA/ATAPI converter connected to one of the first and second data processing devices 110 and 120. The ATA/ATAPI converter may convert access signals of the first and second data processing devices 110 and 120 into access signals in accordance with the ATA/ATAPI standard. Even if the first and/or second data processing devices 110 and 120 do not include an ATA/ATAPI interface, they may use the data transfer interface 100 to access an ATAPI storage drive.

Figure 5:
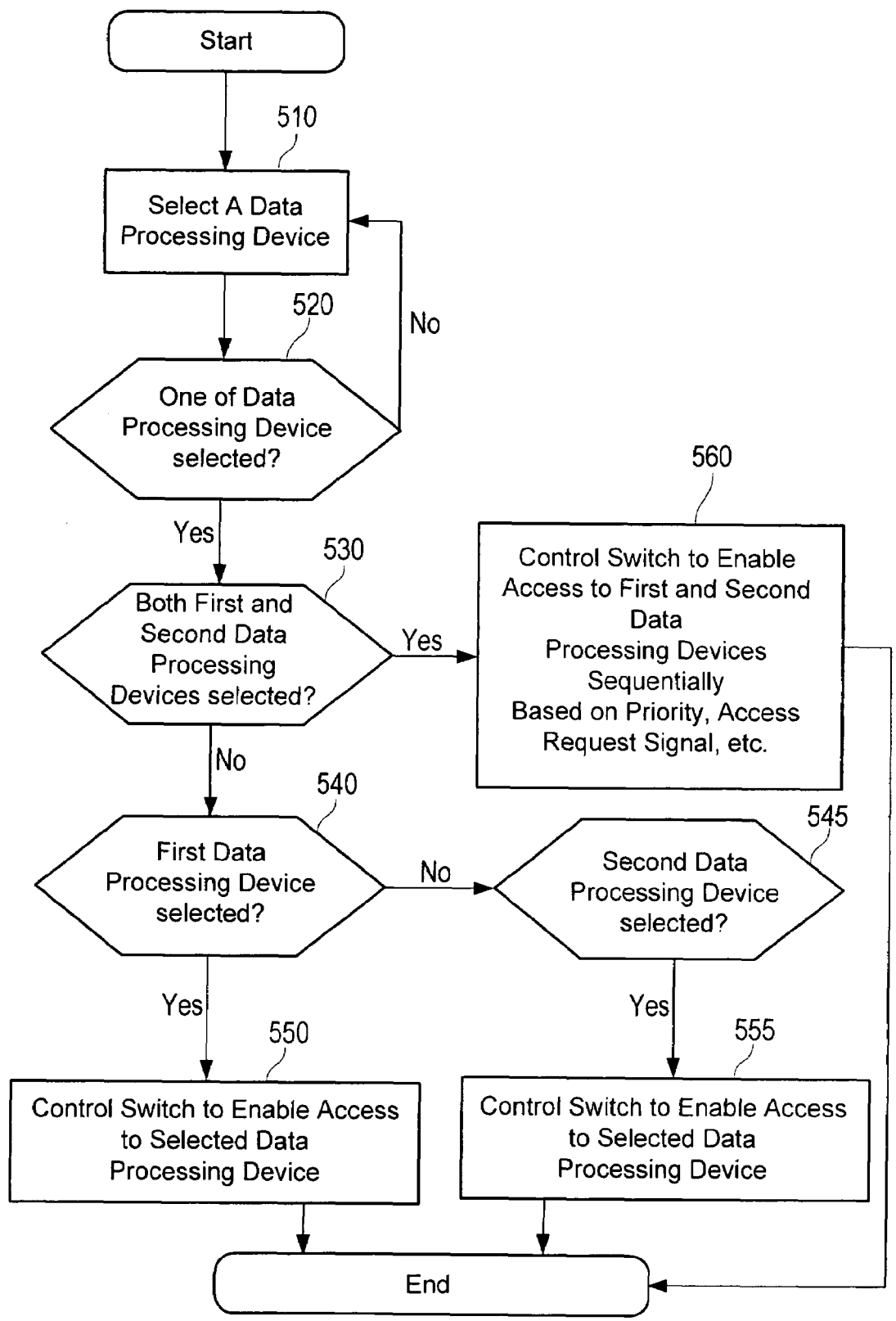
FIG. 5 is a flowchart illustrating an exemplary operation of the data transfer interface of FIG. 4.

FIG. 5 describes an operation of the data transfer interface 100. At act 510, one of the data processing devices may be selected. With the data transfer interface 100, either the first data processing device 110 or the second data processing device 120 may be selected at act 520. At act 530, it is determined whether both first and second data processing devices 110 and 120 is selected. If one of the data processing devices is selected, it proceeds to the next act 540 to determine whether the first data processing device 110 or the second data processing device 120 is selected at acts 540 and 545. At act 540, if the first data processing device 110 is selected, the switch 150 may be controlled to enable the first data processing device 110 to access the data storage drive 130 at act 550. If the second processing device 120 may be selected at act 545, the switch 150 is controlled to enable the second data processing device 120 to access the data storage drive 130 at act 555. At act 530, when both processing devices 110 and 120 are selected, the switch 150 may be controlled to enable the first and the second data processing devices sequentially at act 560. One processing device may be enabled first over the other processing device based on priority, access request signal, interruption signal, etc. Alternatively, or additionally, the main processing device may be first enabled than the auxiliary processing device. For instance, the first data processing device 110 may be the main processing device and the second device 120 may be the auxiliary processing device. As a result, signals are transferred between the selected data processing device 110 or 120 and the data storage drive 130. Subsequent to the acts 550, 555 and 560, the operation of the data transfer interface may end. Alternatively, or additionally, it may proceed to act 510 and start again.

Processing resources of each data processing device 110 and 120 may be used efficiently. The first data processing 110 does not need to access and forward data to the second processing device 120. The second data processing device 120 may be a data processing device with comparably low computing power. The first data processing device 110 may be able to perform its tasks while the second data processing device 120 engages in other computing task such as controlling a computer system or processing car navigation data. The first and second data processing devices 110 and 120 may have a simultaneous access to the data storage drive 130. The switch 150 may prevent the data processing devices 110 and 120 from interfering with each other. For example, when the first data processing device 110 has access to the data storage drive 130, the switch 150 may prevent the second data processing device 120 from interfering with data transfer between the first data processing device 110 and the data storage drive 130, and vice versa. Data transfer may be reliably performed without collisions of access signals issued by different data processing devices 110 and 120. Because only the single storage drive 130 may be used, a compact configuration with less hardware may be achieved.

Figure 6:
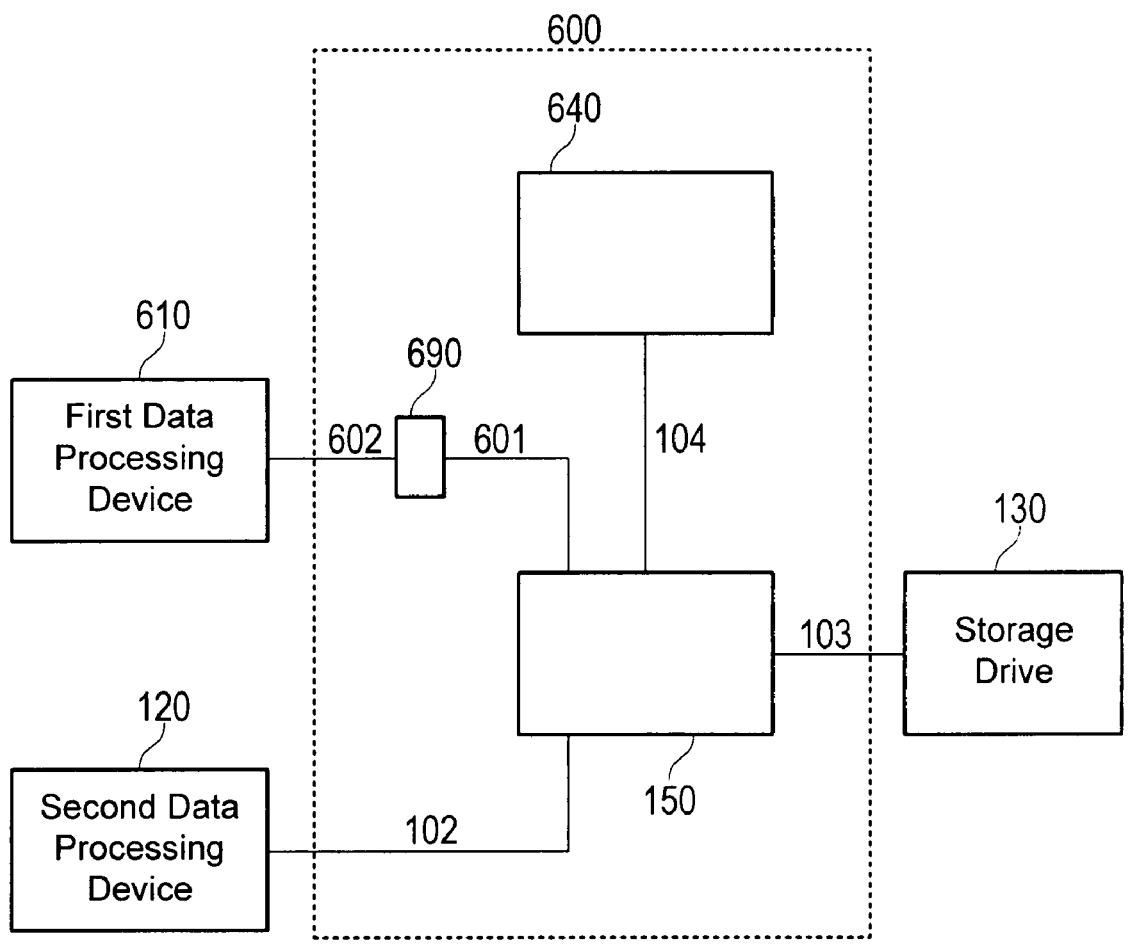
FIG. 6 illustrates a block diagram of a second example of a data transfer interface.

FIG. 6 illustrates a second example of a data transfer interface 600. The data transfer interface 600 may include a control device 640. The data transfer interface 600 may have a different data bus interface from that of a data storage drive and therefore, may include an ATA/ATAPI converter 690. The ATA/ATAPI converter 690 may receives access signals from a first data processing device 610 via a signal line 602. Alternatively, or additionally, the ATA/ATAPI converter 690 may be connected to the second data processing device 120. The ATA/ATAPI converter 690 may perform a conversion of the access signals into access signals in accordance with the ATAPI standard. A signal line 601 may connect the ATA/ATAPI converter 690 with the switch 150. The data processing device 610 may access the data storage drive 130 via the ATA/ATAPI converter 690 and the switch 150. Further, the ATA/ATAPI converter 690 may convert data and drive control signals from the data storage drive 130 into signals in accordance with the interface of the processing device 610. The data processing devices 610 and 120 having different data bus interfaces may access the data storage drive 130 via the data transfer interface 600.

The ATA/ATAPI converter 690 may generate access signals in accordance with a programmed input/output mode 4 (PIO mode 4) of the ATAPI standard. This access mode offers a high data transfer rate. Further, by utilizing only one of the data transfer modes according to the ATAPI standard, the configuration of the ATA/ATAPI converter 690 may be simpler. The ATA/ATAPI converter 690 may provide access to the ATA/ATAPI drive registers via an address space of the ATA/ATAPI converter 690. The address space may be mapped to the ATA/ATAPI drive registers. When the first data processing device 610 accesses this address space, the ATA/ATAPI converter 690 may transfer the corresponding data to the ATAPI storage drive 130. The ATA/ATAPI converter 690 may generate a specific interrupt signal for the first data processing device 610 in accordance with an ATAPI drive interrupt signal. An exemplary data processing device 610 includes a SH3 processor provided by Hitachi, Ltd. For the SH3 processor, a specific interrupt signal IRQ3 may be allocated to the ATAPI drive interrupt such as the data processing device 610.

Based on the above, the data transfer interface 600 may allow a plurality of data processing devices 120 and 610 to individually access the single data storage drive 130. Each data processing device 120 and 610 may carry out data transfer operations in accordance with its own processing requirements. The data processing devices 120 and 610 may perform effective operations, for example, because the first data processing device 610 does not engage in accessing and transferring of data used by the second data processing device 120. As a result, the first data processing device 610 may be able to perform tasks without sharing its processing resources with the second data processing device 120. Further, only the single data storage drive 130 may be needed for data storage in connection with the data processing devices 120 and 610.

Figure 7:
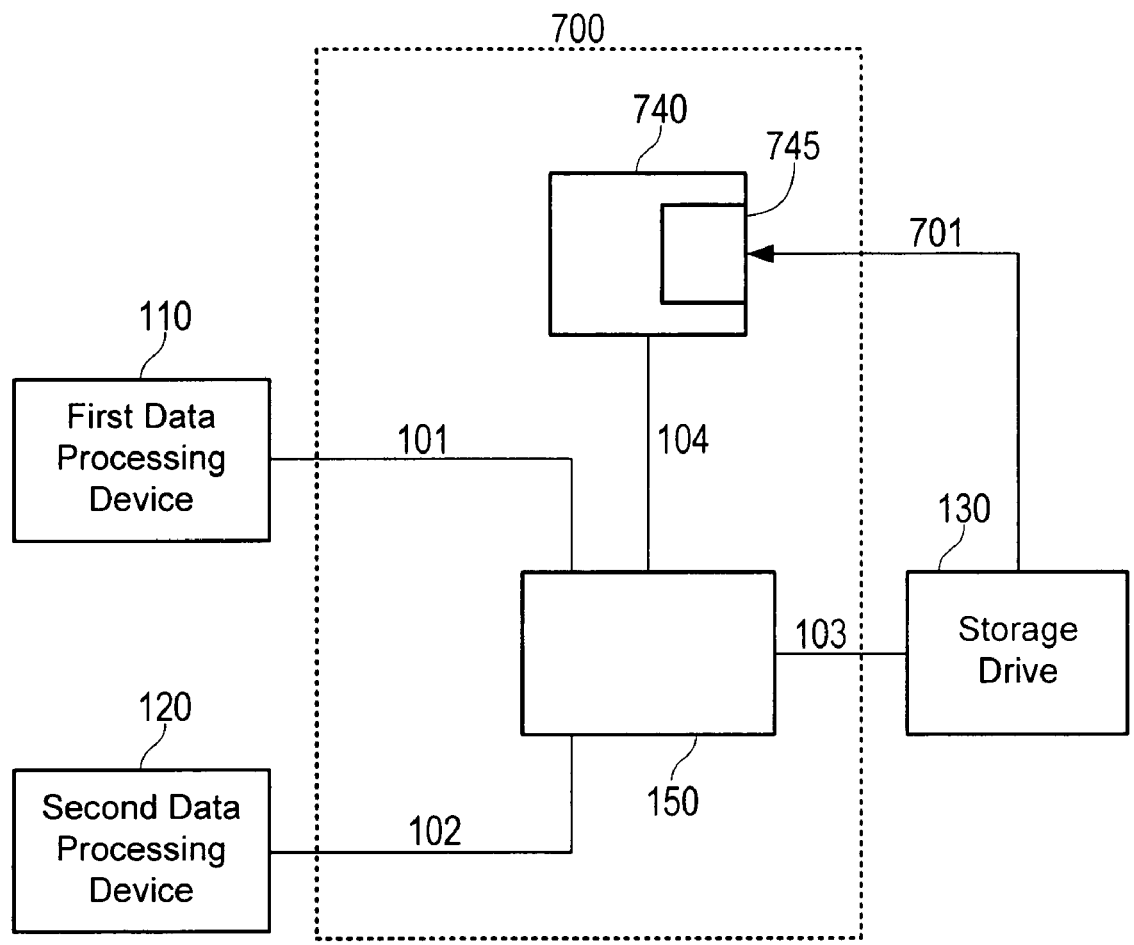
FIG. 7 is a block diagram of a third example of a data transfer interface.

FIG. 7 illustrates a block diagram of a third example of a data transfer interface 700. The data transfer interface 700 may include the first and the second data processing devices 110 and 120, the switch 150 and the data storage drive 130 as shown in FIG. 4. The data interface 700 includes a control device 740 that may drive the switch 150. The control device 740 may include a drive status detector 745 for detecting an operation status of the data storage drive 130. A control signal of the data storage drive 130 may be provided to the drive status detector 745 via a signal line 701. The control device 740 may detect an operating status of the data storage drive 130 and control the switch 150 based on the detected operating status. The drive status detector 745 may detect whether or not a data transfer is currently being performed between one of the data processing devices 110 and 120 and the data storage drive 130. For instance, an input/output ready signal of the data storage drive 130 may be used to detect whether a data transfer has been completed and if the data storage drive 130 is ready for another data transfer. In accordance with the detection result, the switch 150 may be controlled to make a signal transmission between the data storage drive 130 and the second data processing device 120 upon detection of no data transfer. The first data processing device 110 has transferred the data from the data storage device 130. The transfer of data between the first data processing device 110 and the data storage device 130 may be completed reliably and without interruption. The data transfer interface 700 may interact with the first and second data processing devices 110 and 120 such that the first and second data processing devices 110 and 120 may detect the status of the data transfer interface 700.

Figure 8:
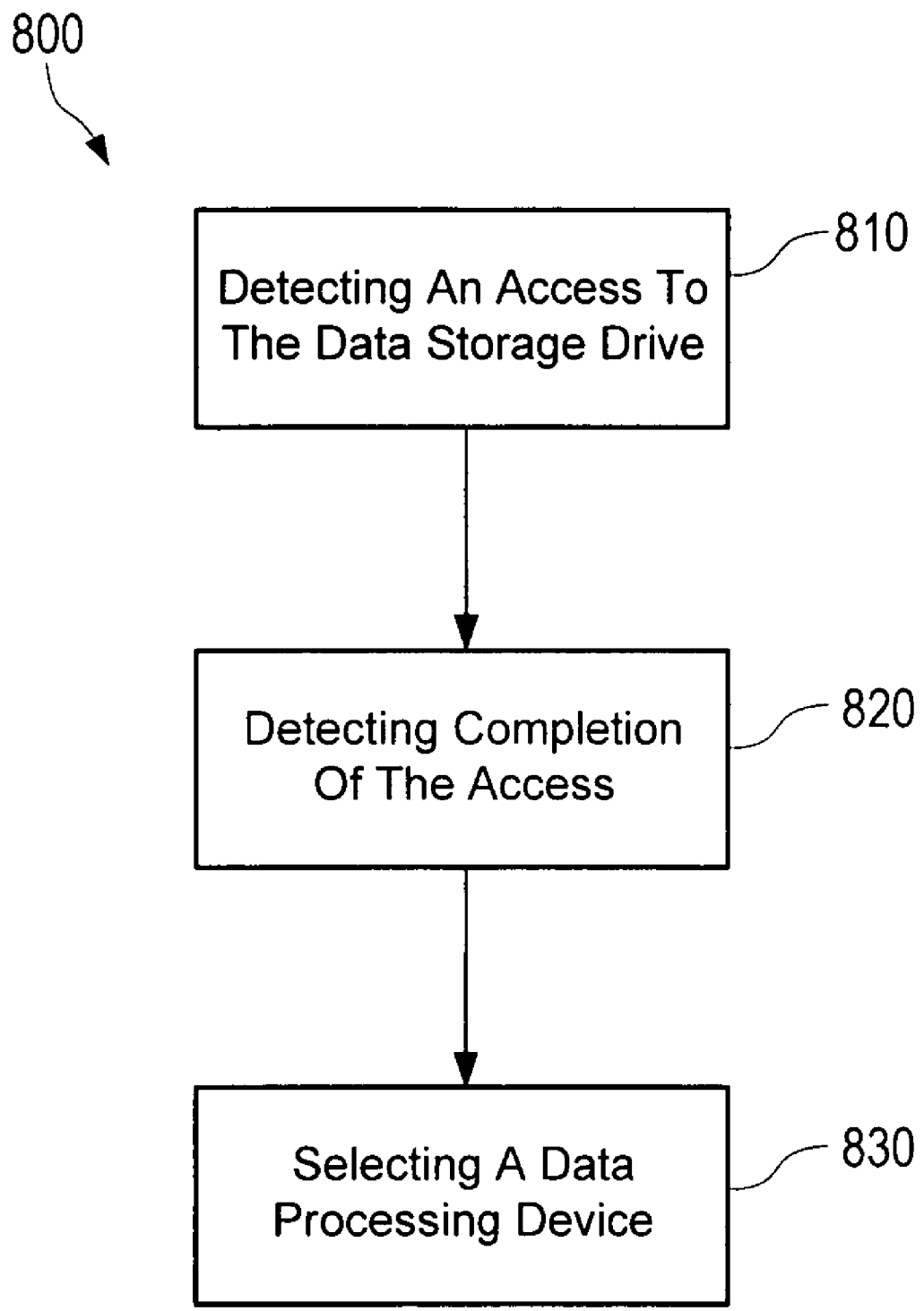
FIG. 8 is a flowchart illustrating detection of an access of the data transfer interface of FIG. 7.

FIG. 8 illustrates an operation of the first and second data processing device 110 and 120. Prior to selection of the first and second data processing device 110 and 120 and control of the switch 150, it is detected whether an access to the data storage drive 130 by one of the data processing device 110 and 120 is currently performed at act 810. Upon detection of the access to the data storage drive 130, switching between the first and second data processing devices 110 and 120 may not occur until the current access to the data storage drive 130 is completed at act 820. When the current access is completed, an access of another data processing device to the data storage drive 130 may be enabled at act 830. For example, the switch 150 may be controlled to enable the second data processing device 120 upon completion of the current access by the first data processing device 110.

The data storage drive 130 may be accessed in accordance with the ATA/ATAPI standard. A transfer operation including initialization of the data storage drive 130 and an actual transferring of data may be completed before the first data processing device 110 or the second data processing device 120 is allowed to access the data storage drive 130. However, it is also possible to terminate the transfer operation after the initialization and re-initialize the data storage drive 130. A drive reset may be performed to reset the data storage drive 130 to an initial status. The data transfer interface 700 may allow the first and second data processing devices 110 and 120 to carry out data transfer operations using the single data storage drive 130. The data transfer interface 700 may ensure that data transfer operations may be completed and that no error due to the interrupted transfer operations or interference between the first and second data processing devices 110 and 120 may occur.

Figure 9:
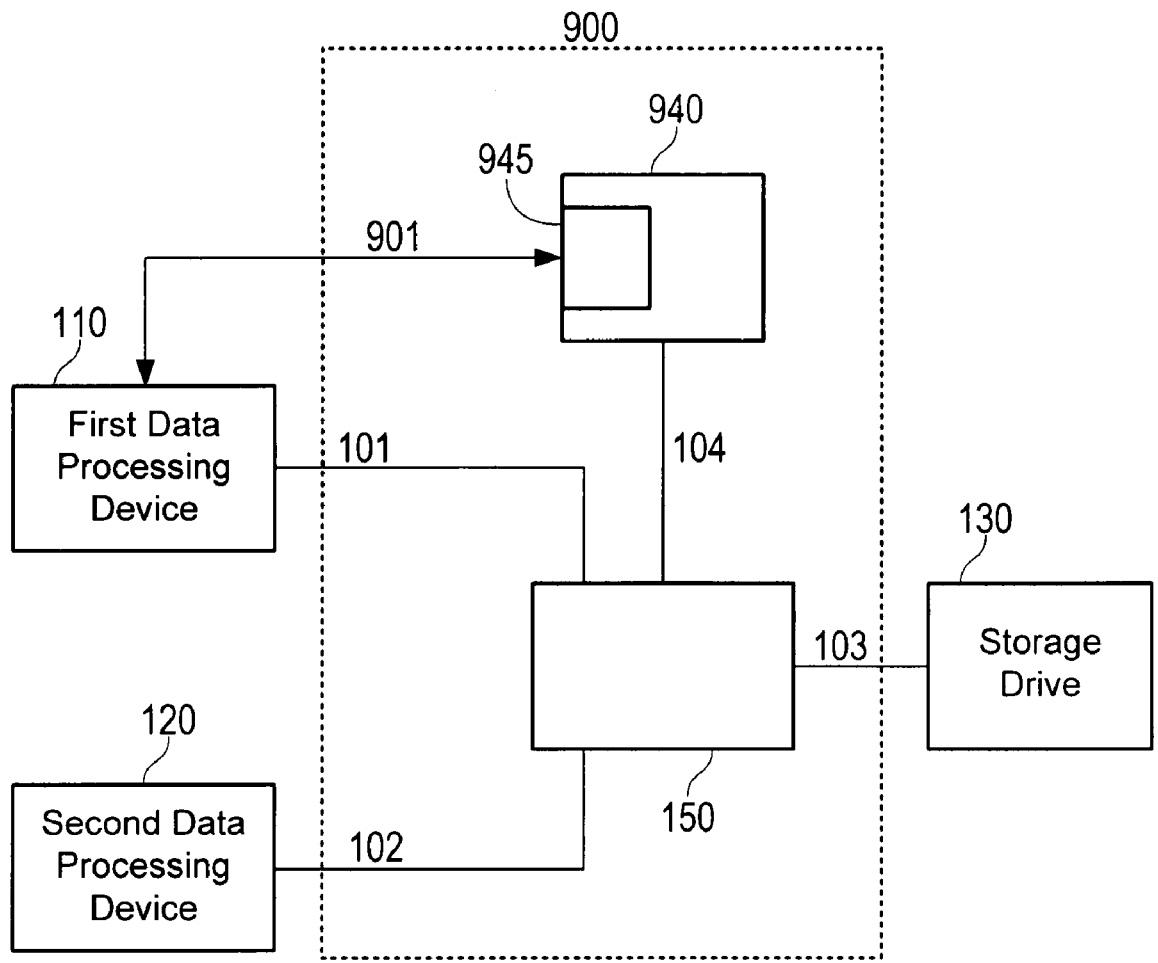
FIG. 9 is a block diagram of a fourth example of a data transfer interface.

FIG. 9 is a block diagram of a fourth example of a data transfer interface. The data transfer interface 900 includes a control device 940 and the switch 150. The control device 940 may include a communication module 945 for exchanging control signals with one of the first and second data processing devices 110 and 120. In FIG. 9, the control device 940 may communicate with the first data processing device 110. A control signal line 901 may be provided between the first data processing device 110 and the communication module 945.

The first data processing device 110 may provide a control signal to the control device 940, for instance, when it has completed a data transfer operation. The control device 940 may detect a completion of an access by the first data processing device 110. The second data processing device 120 may be allowed to access the data storage drive 130 only after the termination of a data transfer operation by the first data processing device 110 is detected. The control device 940 may also provide the first data processing device 110 with an access permission signal. The access permission signal may indicate that the first data processing device 110 is enabled to access the data storage drive 130 via the switch 150. The first data processing device 110 may access the data storage drive 130 upon receipt of the access permission signal. Thus, the second data processing device 120 may not carry out unnecessary access attempts until the switch 150 enables an access to the data storage drive 130. The second data processing device 120 may suspend any data transfer operation until it receives the access permission signal. The first and second data processing devices 110 and 120 are able to be informed whether it may attempt an access or not. Unsuccessful access attempts may be avoided.

Alternatively, or additionally, the control device 940 may provide the first and second data processing devices 110 and 120 with an access termination signal via the communication module 945. Upon receipt of the access termination signal, the first data processing device 110 may terminate the access to the data storage drive 130. It may be necessary to enable the second data processing device 120 to access the data storage drive 130. When the first data processing device 110 accesses the data storage drive 130, the second data processing device 120 may need to be enabled. For example, the second data processing device 120 may have a higher priority than the first data processing device 110. In that case, the second data processing device 120 may be able to suspend the current access by the first data processing device 110 with a lower priority. The first data processing device 110 may be prompted to terminate its current data transfer operation. As a result, none of the first data processing device 110 and the second data processing device 120 may occupy the data storage drive 130 over an extended time period.

Figure 10:
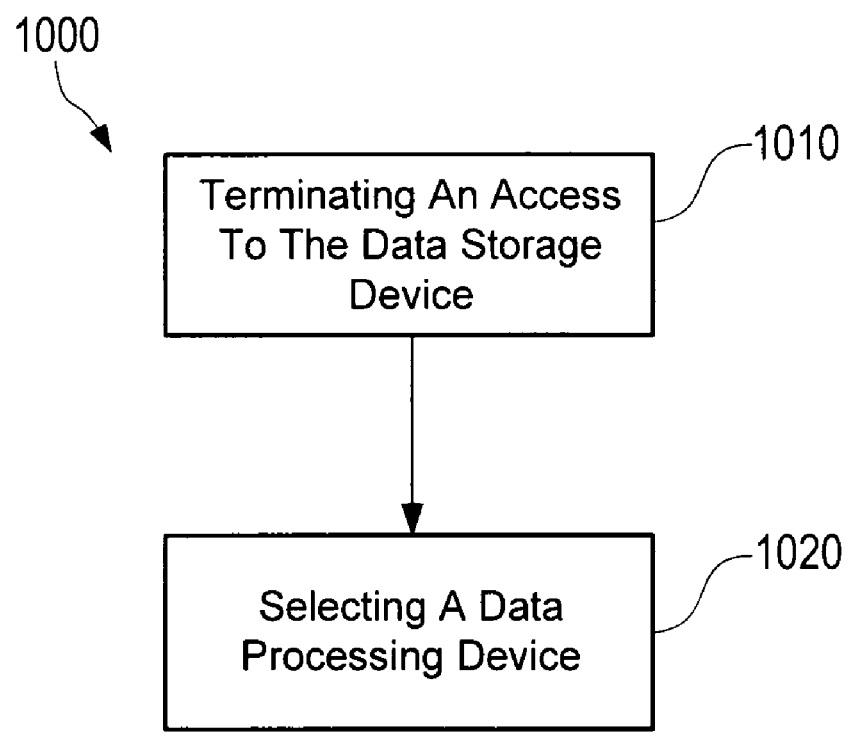
FIG. 10 is a flowchart illustrating termination of an access of the data transfer interface of FIG. 9.

The first or second data processing device 110 or 120 performing an access in accordance with the ATA/ATAPI standard may complete a current data transfer operation. The current data transfer operation includes the initialization of the data storage drive 130 and transferring of data. Thus, the switching operation of the switch 150 may be performed when the data storage drive 130 is ready for another data transfer operation. FIG. 10 illustrates an exemplary operation of the data transfer interface 900 involving access termination. At act 1010, the first data processing device 110 or the second data processing device 120 may be prompted to terminate the access to the data storage drive 130. At act 1020, either the first data processing device 110 or the second data processing device 120 may be selected to access the data storage drive 130.

Figure 11:
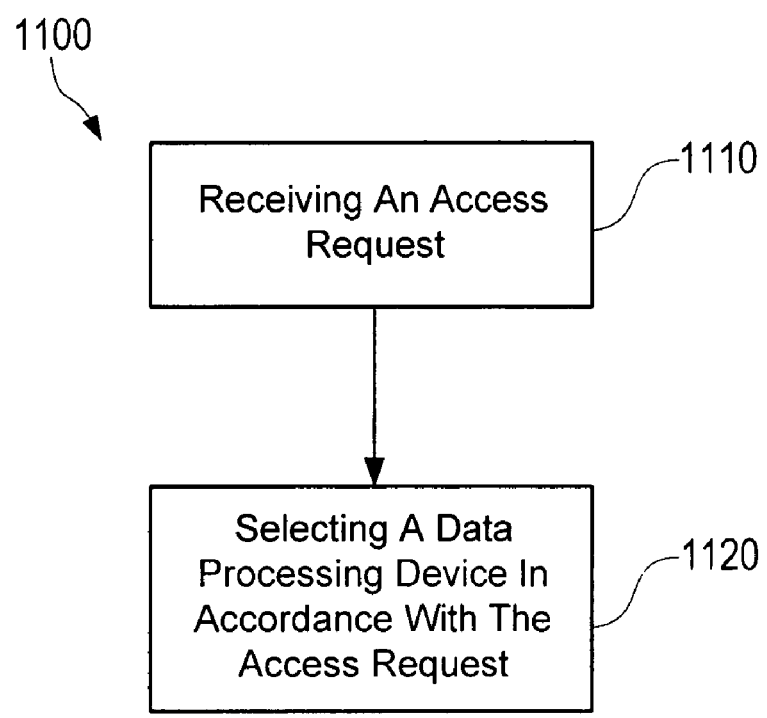
FIG. 11 is a flowchart illustrating an exemplary selection operation of the data transfer interface of FIG. 9.

FIG. 11 is a flowchart illustrating another exemplary operation of the data transfer interface 900 involving an access request. The control device 940 of FIG. 9 may receive the access request from one of the first and second data processing devices 110 and 120 and control the switch 150 in accordance with that access request. For instance, the first and/or second data processing devices 110 and 120 may require an access to the data storage drive 130 to obtain new commands or software updates on a regular basis. By issuing the access request, the first and second data processing devices 110 and 120 may reliably obtain data from the data storage drive 130. The first and second data processing devices 110 and 120 may request more data from the storage drive 130. As shown in FIG. 11, the access request has been received at act 1110 and the control device 940 may carry out the selection of the first data processing device 110 or the second data processing device 120 to access the data storage drive 130 in accordance with the access request at act 1120.

The control device 940 may include an access request queue to sequentially handle at least one access request of the first and second data processing devices 110 and 120. It is also possible to assign the priority to each access request and handle plural access requests in accordance with the priority assigned thereto. For example, the priority may be assigned in accordance with a priority value attributed to each processing device 110 or 120. Alternatively, or additionally, each access request may be assigned with an individual priority. The first data processing device 110 or the second data processing device 120 may generate the access request.

One of the first and second data processing devices 110 and 120 to access the data storage device 130 may be newly selected after the lapse of a predetermined time interval. The switch 150 may be controlled to enable the selected first data processing device 110 or the second data processing device 120 to access the data storage drive 130. The first data processing device 110 or the second data processing device 120 may have access to the data storage drive 130 for a predetermined time interval. It is possible to assign a certain access time to each of the first and second data processing devices 110 and 120. At a certain time interval, each of the data processing devices 110 and 120 is operable to access the data storage drive 130.

Figure 21:
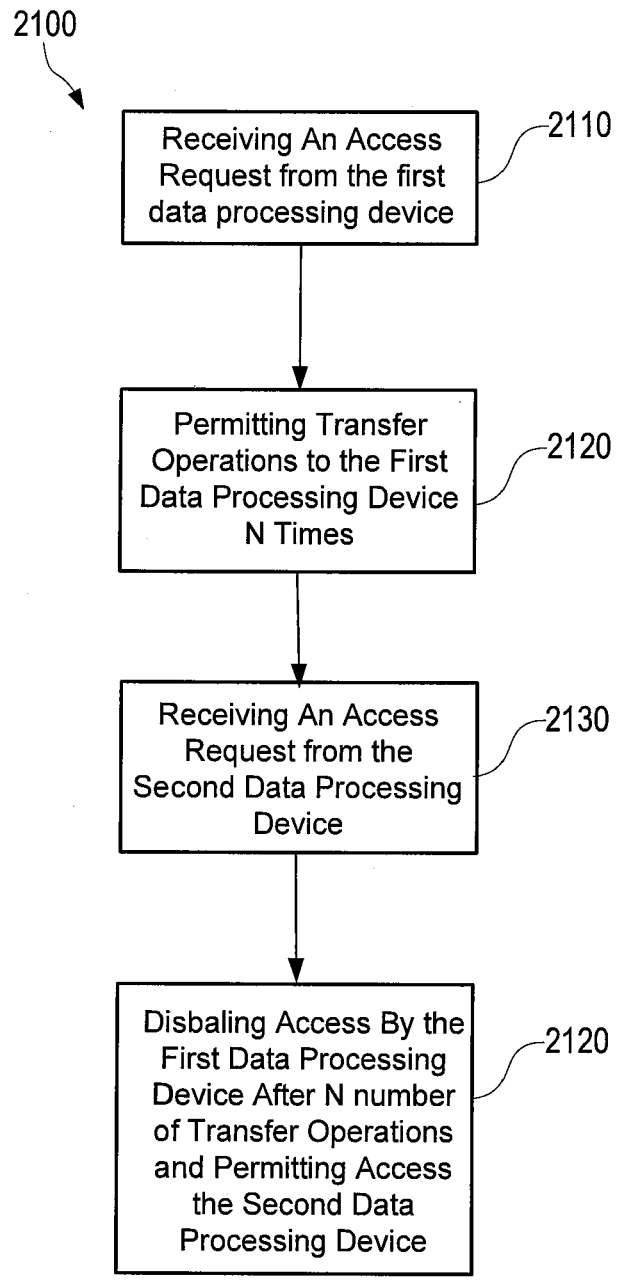
FIG. 21 is a flowchart illustrating another example of data transfer operations.

Alternatively, or additionally, one of the data processing devices 110 and 120 may perform a limited number of data transfer operations to/from the data storage drive 130 and terminate the access as shown in FIG. 21. For example, the first data processing device 110 currently accesses the data storage drive 130 and transfers data to/from the data storage drive 130 a predetermined number of times (blocks 2110, 2120 and 2130 of FIG. 21). After the predetermined number of times, the second data processing device 120 may be selected to access the data storage drive 130 (blocks 2110 and 40 of FIG. 21). Alternatively, or additionally, each of the first and second data processing devices 110 and 120 may be assigned with an individual number of transfer operations (block 2110 of FIG. 21). The assigned number of transfer operations to the first and second data processing devices 110 and 120 may be the same or different (block 2110 of FIG. 21). In this way, a bandwidth of a data bus interface of the data storage drive 130 may be distributed among the first and second data processing devices 110 and 120.

The control device 940 may provide a data processing device designation signal to designate one of the first and second data processing devices 110 and 120 to access the data storage drive 130. In compliance with the data processing device designation signal, the control device 940 drives the switch 150 to enable the designated data processing device to access the data storage drive 130. The data processing device designating signal may be generated via a user interface. For instance, a user may input a command to carry out a specific data processing operation. In accordance with the requested data processing operation, the second data processing device 120 may need to access the data storage drive 130. The data processing device designation signal issued by the user interface may designate the second data processing device 120.

The first and second data processing device 110 and 120 may receive an access permission signal when the switch 150 enables an access to the data storage drive 130. For example, the first data processing device 110 may have access to the data storage drive 130 in accordance with an access request or a data processing device designation signal. The first data processing device 110 may be prompted to terminate its access to the data storage drive 130, for example, because the first data processing device 110 has accessed the data storage drive 130 for a predetermined time interval or a predetermined number of times. As a result, it is possible to flexibly control operations of the data transfer interface 900.

Figure 12:
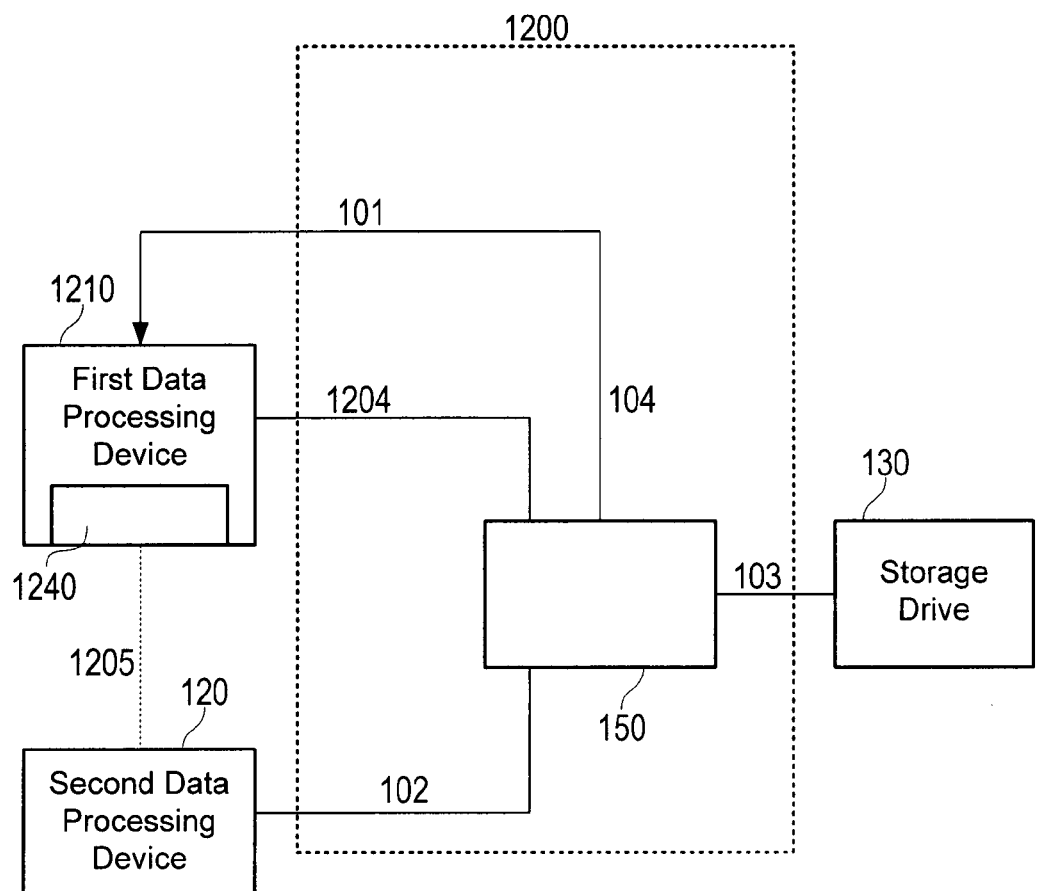
FIG. 12 is a block diagram of a fifth example of a data transfer interface.

FIG. 12 illustrates a fifth example of a data transfer interface 1200. The data transfer interface 1200 includes a control unit 1240 that may designate the first data processing device 1210 or the second data processing device 120. The designated data processing device may have access to the data storage drive 130. Alternatively, or additionally, the control unit 1240 may sequentially select the first and second data processing devices 120 and 1210. The control unit 1240 also may designate one of the first and second data processing devices 120 and 1210 based on a designation signal from a user interface. In the data transfer interface 1200, the control unit 1240 may be part of the first data processing device 1210. Alternatively, or additionally, the control unit 1240 may be part of the second data processing device 120. A control signal line 1205 may be provided between the control unit 1240 and the second data processing device 120. The second data processing device 120 may be controlled with activating or deactivating operations of the first data processing devices 1210. The control unit 1240 may control storage drive accessing function of the second data processing device 120. For instance, access permission signals or access termination signals as described above in conjunction with FIG. 9 may be used to perform such control.

The control unit 1240 may directly control the switch 150, which may enable the first and second data processing devices 1210 and 120 to access the data storage drive 130. As a result, the data transfer interface 1200 may be simplified because a separate control may not be needed. Further, flexible and efficient control of the data transfer interface 1200 may be achieved. The first data processing device 1210 may control the switch 150. Further, the first data processing device 1210 having the control unit 1240 may assign the access permission thereto or to the second data processing device 120 accessing the data storage drive 130. Thus, efficient control of system components may be achieved. Alternatively, or additionally, the control device may further have a switch controller to control the switch 150 in accordance with a signal issued by the control unit 1240. A switch controller will be described in conjunction with FIG. 15.

Figure 13:
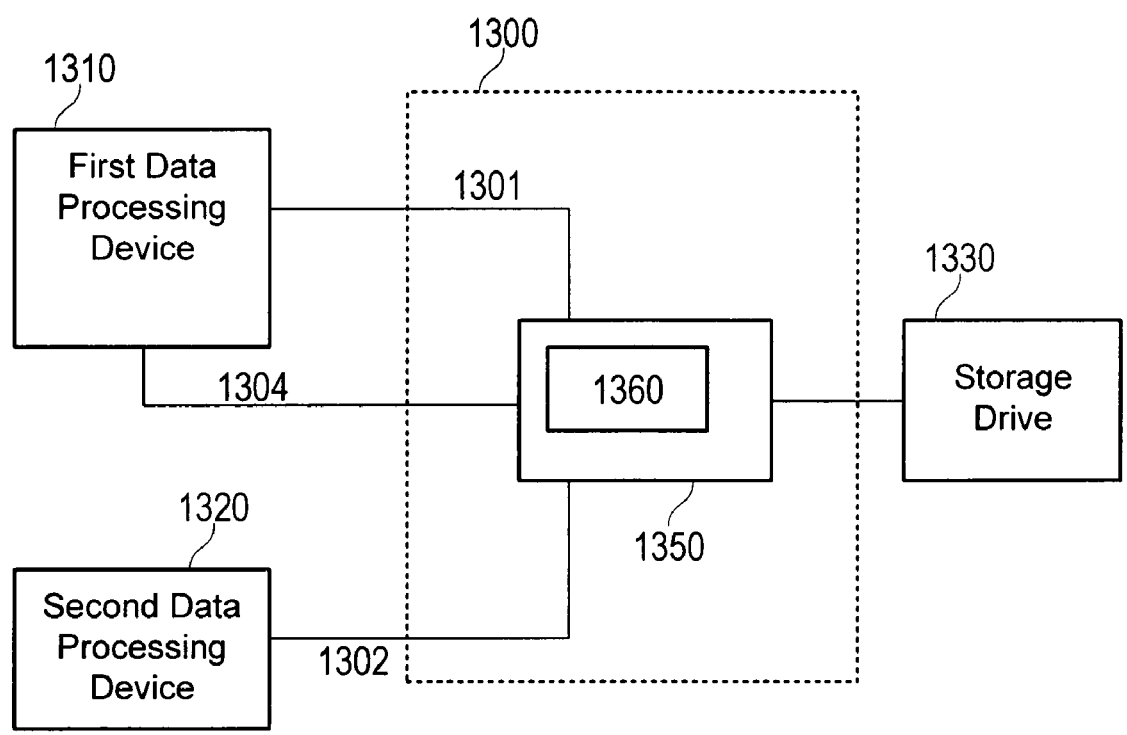
FIG. 13 is a block diagram of a sixth example of a data transfer interface.

FIG. 13 illustrates a sixth example of a data transfer interface 1300. The data transfer interface 1300 includes the first and second data processing devices 1310 and 1320, but more data processing devices are possible. The data transfer interface 1300 includes a switch 1350 that may include a buffer 1360. The buffer 1360 may hold data transmitted to/from the first and second data processing devices 1310 and 1320. The buffer 1360 may be connected to each of the first and second data processing devices 1310 and 1320 and a data storage drive 1330. An exemplary operation of the switch 1330 having the buffer 1360 is described. An access request issued by one of the first and second data processing devices 1310 and 1320 is stored in the buffer 1360 at a predetermined buffer address. By way of example, the first data processing device 130 may issue the access request. If the first data processing device 1310 is currently not allowed to access the data storage drive 1330, the access request is held in the buffer 1360. As soon as the first data processing device 1310 is permitted to access the data storage drive 1330, the access request is read from the buffer 1360 and transmitted to the data storage drive 1330. At the data storage drive 1330, the access request may be carried out. Accordingly, data to be written to the data storage drive 1330 may be accepted or data to be read from the data storage drive 1330 may be transferred to the buffer 1360 and forwarded to the respective data processing device 1310. During that time, the access request from the second data processing device 1320 may be stored in the buffer 1360 and held therein. Accordingly, the access requests from the first and second data processing devices 1310 and 1320 may not interfere with each other. The buffer 1360 may periodically or sequentially determine whether any of the processing devices 1310 and 1320 issues an access request. For instance, the buffer 1360 may schedule such access requests in a queue and carry out the access requests stored in the queue one by one.

The buffer 1360 may provide a plurality of memory sections. Each memory section may correspond to one of the first and second data processing devices 1310 and 1320. An access request of the first data processing device 1310 is written to a respective memory section of the buffer 1360. In accordance with a queue control, the access request is read out and sent to the data storage drive 1330. The data storage drive 1330 responds to the access request and transfers a certain amount of data to the buffer 1360. The transferred data may be read out in accordance with the access request. The transferred data may be stored in the corresponding memory section of the buffer 1330. When the buffer 1330 addresses that memory section of the buffer 1330 later, the data received from the data storage drive 1330 may be read out and transferred to the first and second data processing devices 1310 and 1320. To perform such operations, the buffer 1330 may independently communicate with the first and second data processing devices 1310 and 1320 and the data storage drive 1330.

One host, e.g. the buffer 1360 may access the data storage drive 1330 and may avoid any collisions of data transferred to and from the data storage drive 1330. Further, the first and second data processing devices 1310 and 1320 may access the buffer 1360 in place of the data storage drive 1330, and the buffer 1360 may coordinate and queue the access requests from the first and second data processing devices 1310 and 1320.

Figure 14:
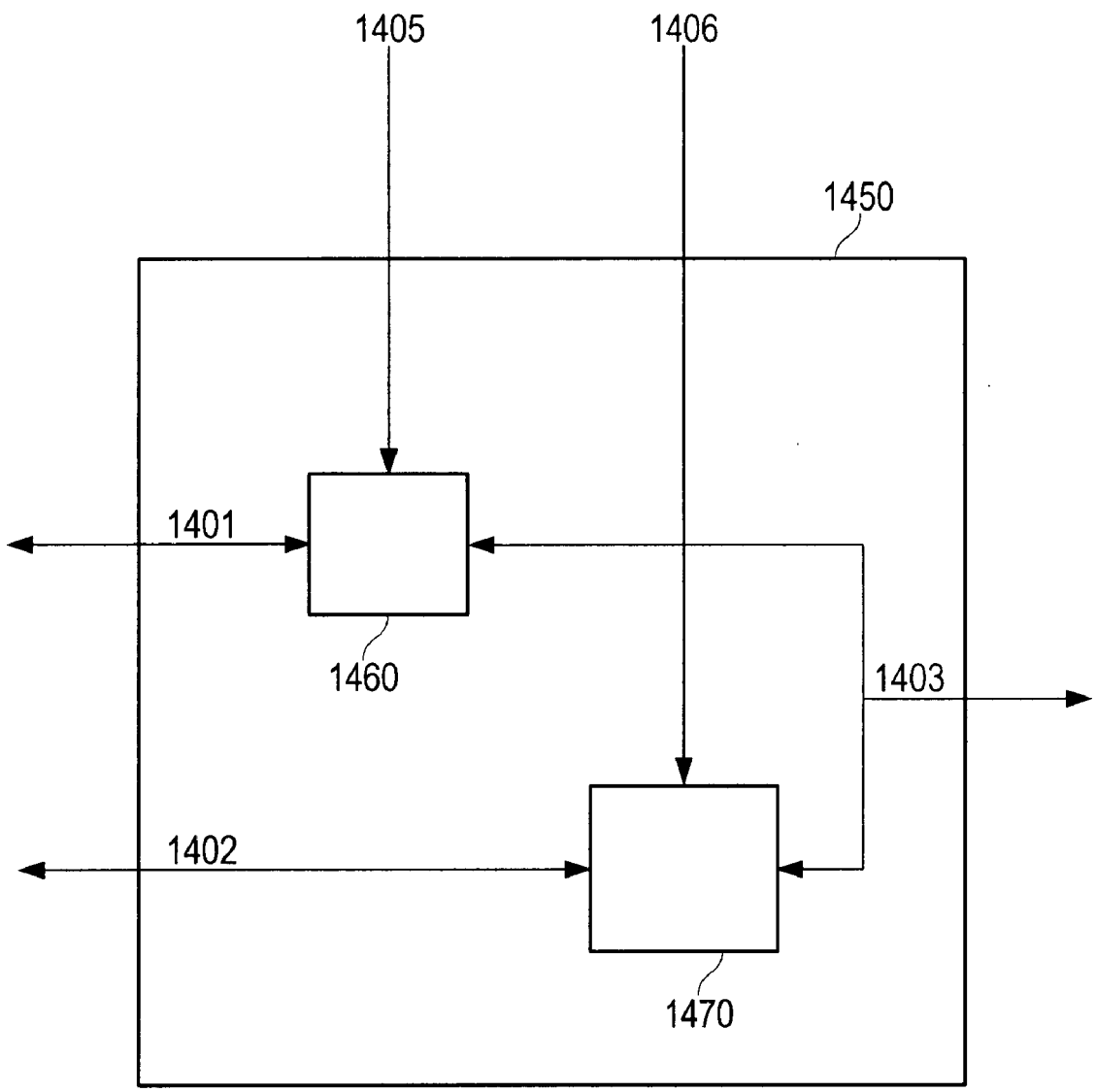
FIG. 14 is a block diagram of one example of a switch.

FIG. 14 illustrates one example of a switch 1450. The switch 1450 may be for use with the data transfer interface illustrated in conjunction with FIGS. 4-13. The switch 1450 may include a first switch 1460. The first switch 1460 may be connected to a first data processing device via a signal line 1401. A second switch 1470 may be connected to a second data processing device by a signal line 1402. The first and second data processing devices may be the data processing device, 110, 120, 610, 1210, 1310 and 1320. Two or more data processing devices are possible. The switch 1450 may be connected to two data processing devices. Alternatively, or additionally, the switch 1450 may be connected to fewer or more data processing devices. The switch 1450 may include more switches to connect with a larger number of data processing devices.

As illustrated in FIG. 14, switches 1460 and 1470 may be connected to the data processing devices via a respective signal line 1401 and 1402. The switches 1460 and 1470 may be jointly connected to a data storage drive by a signal line 1403. The data storage drive may include, for example, the data storage drive 130 or 1330. Control signals may be provided to control the switches 1460 and 1470 to enable or disable transmission of signals between the signal lines 1401 and 1402 and the signal lines 1403. One of the switches 1460 and 1470 may be controlled to allow transmission of signals. Separate control signal lines 1405 and 1406 may be provided for the control of the switches 1460 and 1470.

Figure 15:
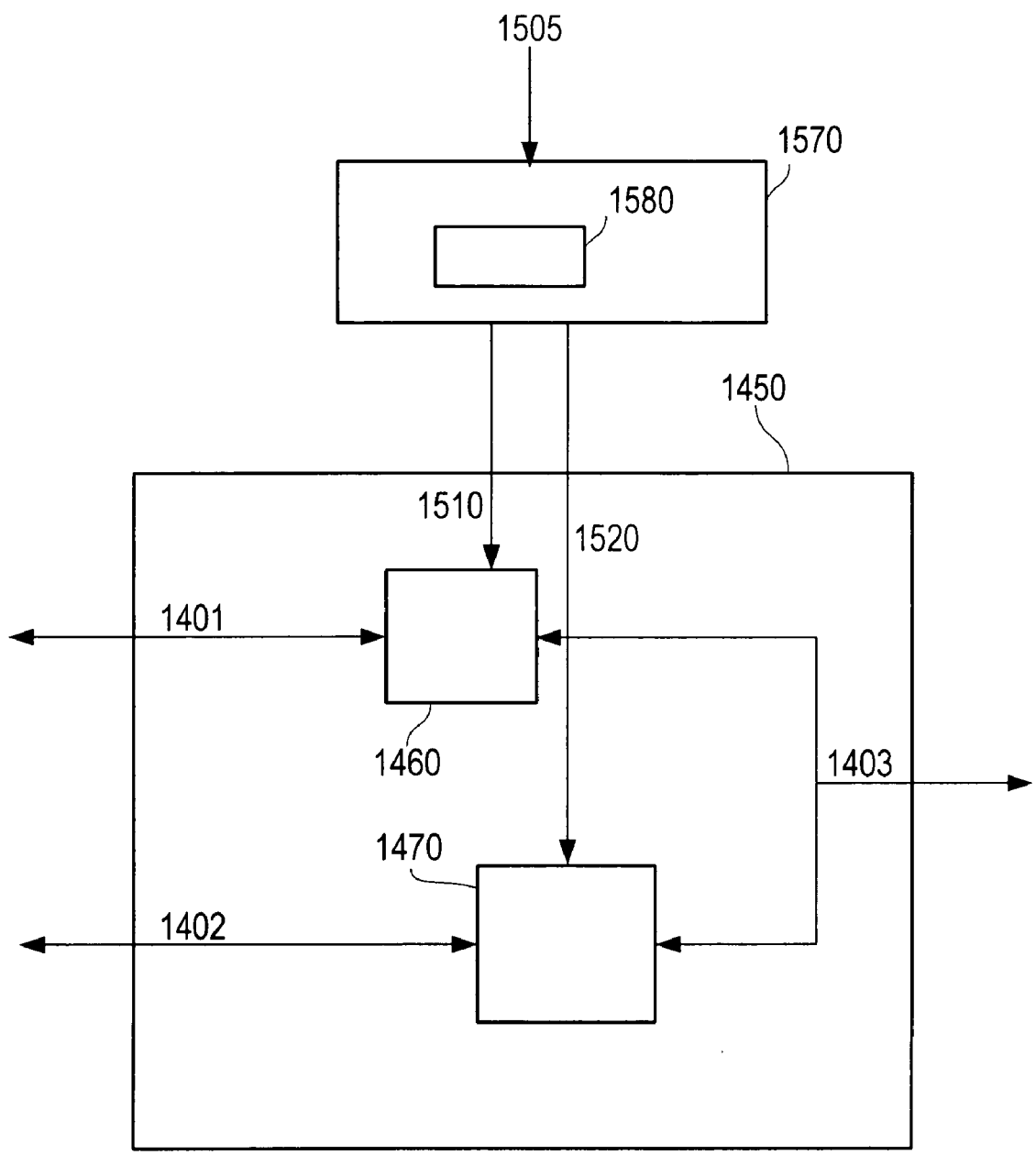
FIG. 15 is a block diagram of one example of a switch controller.

FIG. 15 illustrates an exemplary configuration of a control device 1570 that may drive the switches 1460 and 1470 of FIG. 14. The control device 1570 may include a switch controller 1580 for controlling the switches 1460 and 1470. The switch controller 1580 may activate only one of switches 1460 and 1470 to enable transmission of signals via the activated switch and all of other switches are deactivated. The switch controller 1580 receives a signal designating a data processing device to access a data storage drive such as the data storage drive 130 and 1330. In accordance with the designating signal, the switch controller 1580 may generate switch control signals 1510 and 1520 so that only one of the switches 1460 and 1470 is activated. Accordingly, one of the data processing devices may be enabled to access the data storage drive at a time. A data transfer interface including the switch 1450 and the switch controller 1580 may avoid interference of signals generated by the plurality of data processing devices.

The switch controller 1580 may control the switches 1460 and 1470 to connect the data storage drive to one of the plurality of data processing devices. It is possible that only one of the data processing devices may access the data storage drive at a time. The switch controller 1580 may control buffers to transmit signals between the data storage drive and the one of the plurality of data processing devices. Efficient control of the transmission of data via the switches 1460 and 1470 may be achieved. The switch 1450 may include at least one buffer. The buffer may be equipped with an output enabling means. The output enabler may be connected to the switch controller 1580 to control the data output from the buffer. Accordingly, transmission of data via the switches 1460 and 1470 may be reliably controlled.

Figure 16:
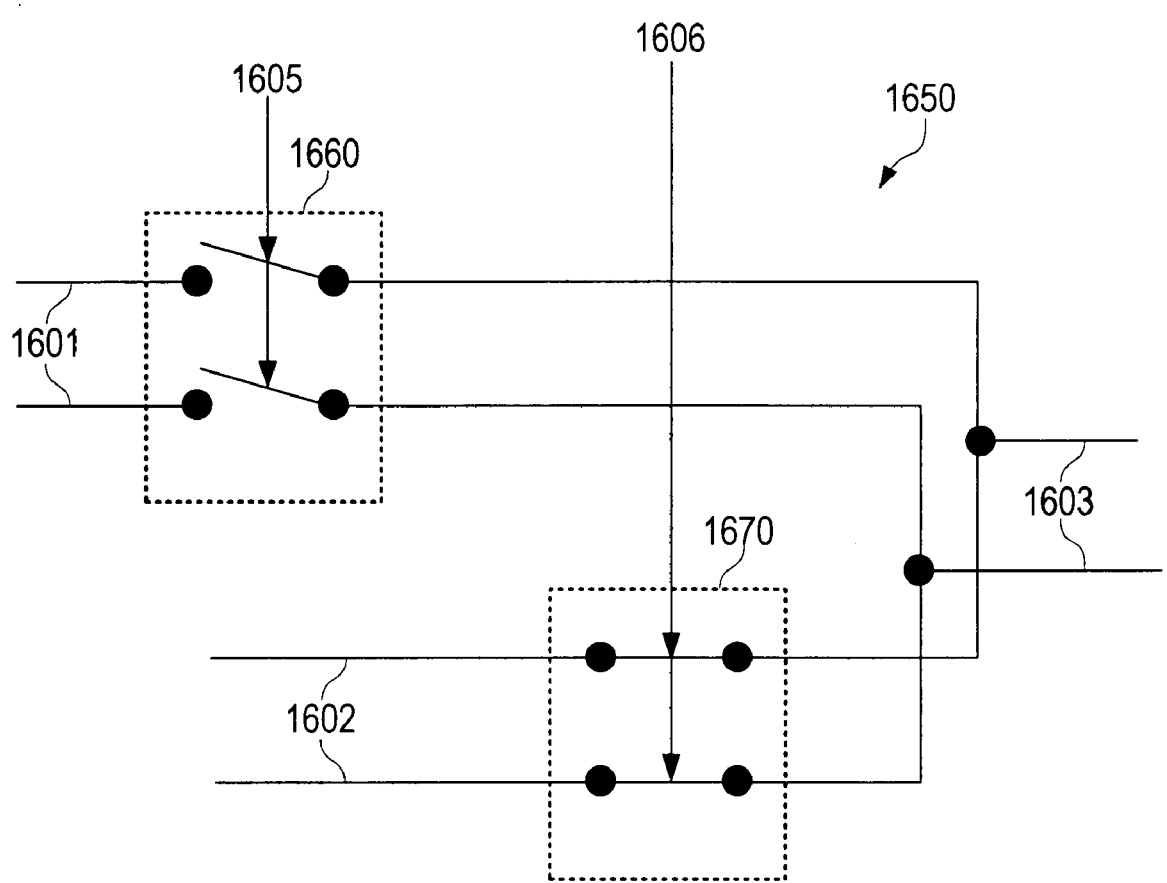
FIG. 16 is a circuit diagram of an exemplary configuration of switches.

FIG. 16 illustrates an exemplary structure of a switch 1650 for use with a data transfer interface. The switch 1650 may include a plurality of switches 1660 and 1670 for enabling or disabling the signal transmission on a plurality of signal lines 1601 and 1602. The signal lines 1601 and 1602 may be connected to a plurality of data processing devices and a plurality of signal lines 1603 may be connected to a data storage drive. For example, the data processing device may include data processing devices 110, 120, 610, 710, 1310 and 1320, and the data storage drive may include the data storage drive 130 and 1330. In FIG. 16, the two switches 1660 and 1670 and two signal lines 1601 to 1603 may be used, but fewer or more switches and signal lines are possible. Where an ATA/ATAPI drive is used, a plurality of data signal lines, address signal lines and control signal lines may be used as noted above in conjunction with FIG. 4-5. The switches 1660 connected to the signal lines 1601 may be jointly controlled via a control signal line 1605. Further, control signals on a control signal line 1606 may jointly control the switches 1670 connected to the signal lines 1602. The switches 1660 and 1670 may include a controllable buffer for holding and transmitting data on the signal lines in accordance with a respective control signal.

The switches 1660 and 1670 may include any type of semiconductor switches or mechanical switches. Alternatively, or additionally, the switches 1660 and 1670 may be any type of switches such that an electrical connection is established between signal lines 1603 and the signal lines 1601 or 1602. The data transfer interface using the switches 1660 and 1670 may not be limited to establishing electrical connection on signal lines between the data processing device and the data storage drive. For instance, the switches 1660 and 1670 may enable or disable a signal transfer without the electrical connection between signal lines of the data processing devices and signal lines of the data storage drive. For example, opto-electronic couplers may be used.

Figure 17:
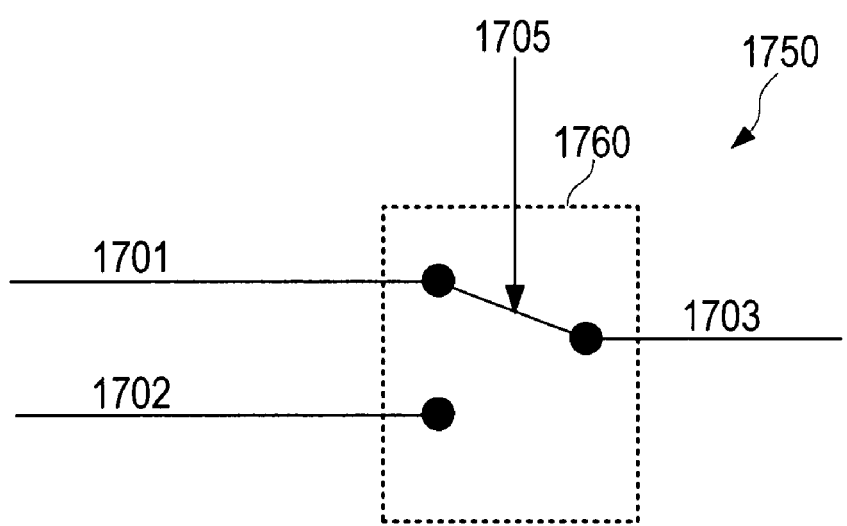
FIG. 17 is a circuit diagram of an exemplary selector switch.

FIG. 17 illustrates a switch 1750 with a selector switch 1760. The selector switch 1760 may establish an electrical connection between one of signal lines 1703 connected to a data storage drive and signal lines 1701 and 1702 connected to different data processing devices. The data storage drive and the data processing devices may include, for example, the data storage drive 130 and 1330 and the data processing devices 110, 120, 610, 1210, 1310 and 1320. An interrupt signal or a status signal from the data storage drive may be provided to a selected data processing device via the selector switch 1760. Thus, control signals of the data storage drive may be reliably provided to the selected data processing device. The control signals from the data storage drive may not interrupt the operation of other data processing devices.

Figure 18:
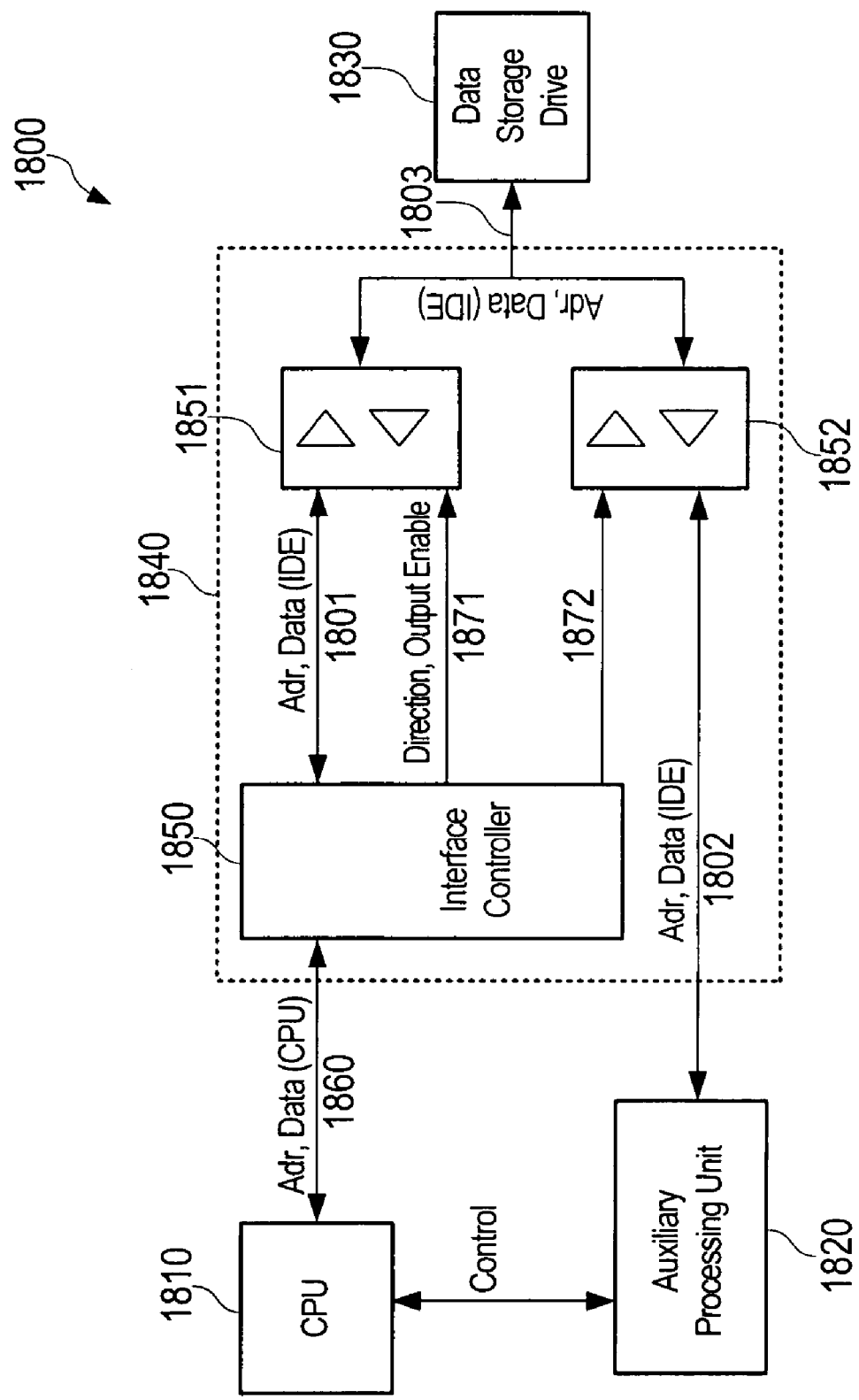
FIG. 18 is a circuit diagram of an exemplary information and/or entertainment system with a data transfer interface.

FIG. 18 illustrates an exemplary configuration of an information and/or entertainment system 1800 including a data transfer interface 1840. A central processing unit 1810 and an auxiliary processing unit 1820 may be connected to the data transfer interface 1840 to access a data storage drive 1830. More processing units may be used with the information and/or entertainment system 1800.

The central processing unit 1810 may control the information and/or entertainment system 1800 and perform a variety of tasks such as providing a user interface for the information and/or entertainment system 1800. Other tasks may include providing an e-mail client, a picture viewer, video games, car navigation software and the like. The auxiliary processing unit 1820 may perform a specific processing operation. The auxiliary processing unit 1820 may be optimized to carry out the specific processing operation. For instance, the auxiliary processing unit 1820 may carry out decoding of an encoded video data. The video data may be encoded and stored in a format according to the MPEG (Moving Picture Experts Group) standard and/or DivX® specification. Other formats may be used. Because decoding the formatted video data may demand a high computation performance, the auxiliary processing unit 1820 may be dedicated to such task. The burden of the central processing unit 1810 may be reduced and a relatively inexpensive central processing unit with lower computing power may be used. As a result, the central processing unit 1810 may perform separate tasks while video data is being decoded.

The information and/or entertainment system 1800 may be used with a vehicle. The system 1800 may be designed and/or configured to be suitable for use with a vehicle. Various other uses of the system 1800 may be possible. The system 1800 may be integrated with other electronic systems of the vehicle. Alternatively or additionally, the system 1800 may be separately placed from the vehicle electronic system. The central processing unit 1810 may run vehicle navigation software. For example, as the data storage drive 1830, a DVD drive may be used. The central processing unit 1810 may access the DVD drive to read navigation information such as roadmaps and/or software for a system update stored on a respective DVD storage medium. The central processing unit 1810 and the auxiliary processing unit 1820 may independently access the DVD storage drive. The central processing unit 1810 does not have to perform access and transfer operations to provide the auxiliary processing unit 1820 with data stored on the DVD drive. As a result, the central processing unit 1810 may spare processing resources for a task such as system control and car navigation. Further, no separate data storage drive for each of the central processing unit 1810 and the auxiliary processing unit 1820 may be needed. The system 1800 may be cost-efficient and compact.

The data transfer interface 1800 includes a switch including two switches 1851 and 1852. More switches may be used. The switches 1851 and 1852 may include buffers for transferring data on signal lines between the data storage drive 1830 and each of the processing units 1810 and 1820. A control device may be provided as a part of the central processing unit 1810. The control device may designate a data processing unit to have access to the data storage drive 1830. For instance, if the new car navigation data or new system software is to be read from the DVD drive as the data storage drive 1830, the central processing unit 1810 may be designated to access the DVD drive. If a movie from a DVD disk is to be played, the auxiliary processing unit 1820 may include a DVD decoding unit to access the data storage drive 1830.

The data transfer interface 1810 may include an interface controller 1850. This interface controller 1850 may include a switch controller for controlling the switches 1851 and 1852. Further, the interface controller 1850 may also include an ATA/ATAPI converter that converts access signals of the central processing unit 1810 into access signals in accordance with the ATA/ATAPI standard. The access signals may be transmitted via signal lines 1860. The interface controller 1850 may be implemented with a field programmable gate array (FPGA) device. The FPGA interface controller may include all hardware components of the data transfer interface 1840 except the switches 1851 and 1852. Along with the central processing unit 1810, the FPGA interface controller 1850 efficiently controls the data transfer interface 1840. The FPGA interface controller 1850 may include a switch controller and an ATA/ATAPI converter and form a single device. A high integration of interface components and a compact interface controller may be achieved.

In the information and/or entertainment system 1800, the auxiliary processing device 1820 may be, for example, a DVD decoding unit and the data storage drive may be a DVD drive. The auxiliary processing unit 1820 also performs file navigation on the DVD storage medium storing video data and decoding of the stored video data. The DVD decoding unit may contain DVD file navigation software. As a result, the DVD decoding unit may be able to access the DVD storage medium storing video data and the like. If the auxiliary processing unit 1820 is the DVD decoding unit, it is no longer needed to develop the DVD navigation software.

When the auxiliary processing unit 1820 is the DVD decoding unit and the data storage drive 1830 is the DVD drive, the data transfer interface 1800 operates as follows. When the central processing unit 1810 accesses the DVD drive 1830, the operation of the DVD decoding unit 1820 may be suspended with a control signal from the central processing unit 1810. Further, a data processing device designation signal may be provided to the interface controller 1850 to control the switch controller therein. Accordingly, the switch controller activates the switch 1851 to transmit data between the central processing unit 1810 and the DVD drive 1830. At the same time, the switch 1852 is disabled so that no signals may be transmitted between the DVD decoding unit 1820 and the DVD drive 1830. The access of the central processing unit 1810 to the DVD drive 1830 may not be interrupted by any signal from the DVD decoding unit 1820. Access signals of the central processing unit 1810 are transferred to the interface controller 1850, which converts the access signals into signals in accordance with the ATA/ATAPI standard. These signals are transferred to the DVD drive 1830 via the switch 1851. The switches 1851 and 1852 may have buffers for transmitting signals on the signal lines 1801, 1802 and 1803. Direction control signals 1871 and 1872 determine the direction of data to be transferred, as will be described in detail.

When the DVD decoding unit 1820 is to access the DVD drive 1830, it receives a control signal from the central processing unit 1810. The central processing unit 1810 further provides a designation signal to the interface controller 1850 indicating that the DVD decoding unit 1820 is to access the DVD drive 1830. The switch 1851 is disabled and the switch 1852 is activated, thereby to allow transmission of data between the DVD decoding unit 1820 and the DVD drive 1830. The DVD decoding unit 1820 may be able to access the data stored on the DVD drive 1830. The DVD decoding unit 1820 may be a commercially available semiconductor device such as ST5508 device. The DVD decoding unit 1820 may be manufactured in mass production for use with consumer video devices such as DVD players. The DVD decoding unit 1820 may be cost-efficient. The DVD decoding unit 1820 may be efficiently integrated in any vehicle information and/or entertainment system such as the system 1800.

As described with the above exemplary operation, each of the central processing unit 1810 and the auxiliary processing unit 1820 may individually access the data storage drive 1830 without wasting each other's processing resources. The processing resources may be efficiently used. The central processing unit 1810 with a comparably low computing power may perform a predetermined set of tasks such as control operations without being affected by a simultaneous data transfer between the data storage drive 1830 and the auxiliary processing unit 1820. Further, each processing unit 1810 and 1820 may be dedicated to processing of a certain type of stored data, thereby to increase processing efficiency. Because both processing units 1810 and 1820 may access the same data storage drive 1830, the system configuration with high space efficiency may be achieved. The auxiliary processing unit 1820 may include decoding means that is operable to decode at least one of video and audio data stored on the data storage drive 1830. The auxiliary processing unit 1820 may engage in complex video/audio decoding processing, thereby to impose a lower processing load on the central processing unit 1810. A more efficient use of processing resources may be achieved.

As noted above, the information and/or entertainment system 1800 may have a magnetic or optical disk drive such as a hard disk drive and a DVD drive. Various high capacity storage means are possible. In particular, the DVD format is now widely used and storage media may be available. The auxiliary processing unit 1820 may include file navigation means that performs DVD file navigation. The processing unit including a DVD file navigation means may be commercially available and reduce development efforts.

An access to the data storage drive 1830 may be carried out as follows. Each transfer operation includes initializing the data storage drive 1830 for the data transfer and performing the data transferring. It is detected whether a selected data processing device 1810 or 1820 has completed an access to the data storage drive 1830. Only after the access has been completed, another data processing device is selected to access the data storage drive 1830. As a result, each access may be reliably completed. Each data processing device 1810 or 1820 may carry out a predetermined number of transfer operations before another data processing device accesses the data storage drive 1830. Thus, the data transfer interface 1800 may be efficiently controlled and the data processing devices 1810 and 1820 may be equally provided with data storage resources.

Figure 19:
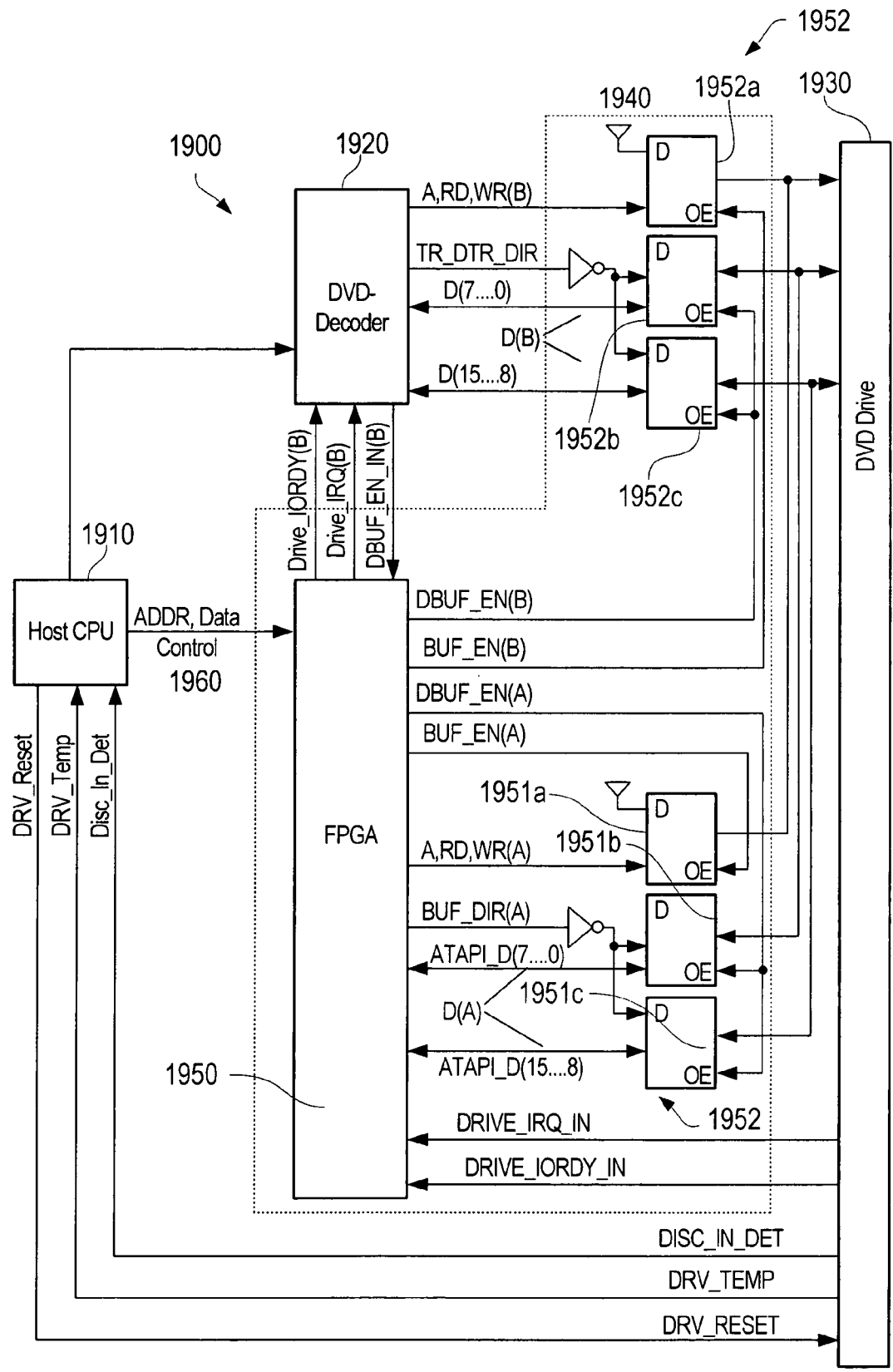
FIG. 19 is a hardware diagram of an information and/or entertainment system with a DVD drive.

FIG. 19 illustrates one example of a vehicle information and/or entertainment system including a DVD drive and a DVD decoder. The vehicle information and/or entertainment system 1900 may be an embedded processing system such as SH3 processors and ARM processors. For an auxiliary processing unit, a standard DVD decoder 1920 may be used. A switch 1952 may be arranged between the decoder 1920 and the DVD drive 1930. A switch 1952 may include three buffers 1952a, 1952b and 1952c. The DVD decoder 1920 may include an ATAPI interface. The DVD drive 1930 also may be equipped with the ATAPI interface. A first buffer 1952a may be connected between address signal lines and read/write control lines A, RD, WR(B). Two other buffers 1952b and 1952c may be used for transmitting signals on data signal lines D(B).

The buffers 1952a, 1952b and 1952c may include an output enable control input OE. Control signals BUF_EN(B) and DBUF_EN(B) may be provided to output enable control inputs OE by an interface controller 1950 to control data transfer via buffers. The buffers 1952a, 1952b and 1952c output data to be transferred on the signal lines A,RD,WR(B) and D(B) when they receive control signals at their output enabling control input OE. The buffers 1952a, 1952b and 1952c may further include a direction control input for controlling the direction of data transferred on the signal lines. The buffer 1952a is configured to transmit the signals A,RD, WR(B) from the DVD decoder 1920 to the DVD drive 1930. The transfer direction of data via the buffers 1952b and 1952c connected to the data signal lines D(B) is controlled with the signal, TR_DTR_DIR from the DVD decoder unit 1920.

Likewise, a second set of buffers 1951a, 1951b and 1951c connect an ATA/ATAPI converter to the DVD drive 1930. The ATA/ATAPI converter may be provided within the interface controller 1950. The configuration of these buffers corresponds to the configuration of buffers 1952a-c described above. The first buffer 1951a is provided for address, read and write signals A,RD,WR(A) and two other buffers 1951b and 1951c may be provided for data signal lines D(A). The buffers 1951a, 1951b and 1951c connected to the ATA/ATAPI converter may enable or disable the data transfer between the central processing unit 1910 and the DVD drive 1930. The interface controller may control the buffers 1951a, 1951b and 1951c via the control signal BUF_EN(A) and DBUF_EN(A) connected to the output enabling control input OE of the buffers 1951a, 1951b, and 1951c.

From the interface controller 1950, additional direction control signal BUF_DIR(A) may be provided to control the direction of signals transferred by the buffers 1951b and 1951c. Signal lines from the buffers 1951a-c and 1952a-c may be jointly connected to the ATAPI interface of the DVD drive 1930. Drive control signals from the DVD drive 1930 may be provided to the data processing device, which accesses the DVD drive 1930 such as the DVD decoder 1920. These signals include a drive interrupt signal DRIVE_IRQ_IN to control a data access operation and a drive in/out ready signal DRIVE_IORDY_IN to indicate when the data storage drive accepts another data transfer. These signals are either provided to the DVD decoder 1920—as signals DRIVE_IRQ(B), DRIVE_IORDY(B)—or the ATA/ATAPI converter of interface controller 1950. The ATA/ATAPI converter may convert and provide the signals to the central processing unit 1910. Another drive control signals such as a medium detection signal DISC_IN_DET and a drive temperature signal DRV_TEMP may be provided to the central processing unit 1910. The central processing unit 1910 also provides a drive reset signal DRV_RESET to the DVD drive 1930 for resetting the DVD drive to as an initial status.

A control unit may be a part of the central processing unit 1910, thereby to efficiently and reliably control an access of the auxiliary processing unit 1920 or the central processing unit 1910 to the DVD drive 1930. The switch 1951*a-c* and 1952*a-c* ensures that no interference between the processing units 1910 and 1920 occurs during the data transfer. The signals from the DVD drive 1930 may be provided to only one of the data processing device 1910 or 1920 that currently has access to the DVD drive 1930. Tasks performed by the central processing unit 1910 may not be interrupted while the DVD decoder 1920 accesses the DVD storage drive 1930. This is because a drive interrupt signal DRV_IRQ_IN may be provided only to the DVD decoder 1920 at that time.

Figure 20:
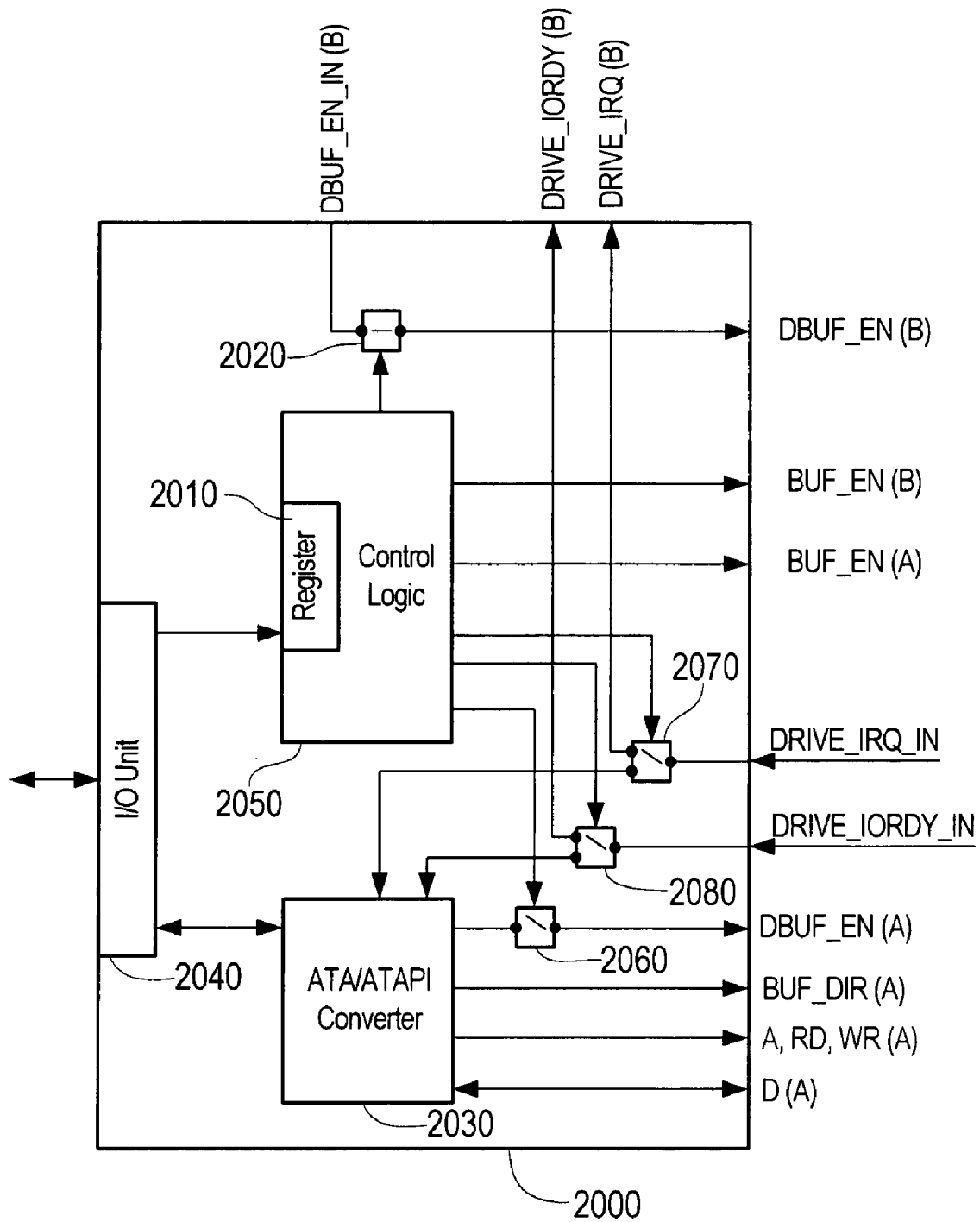
FIG. 20 is a structure diagram of an interface controller.

FIG. 20 illustrates an exemplary configuration of an interface controller 2000. The interface controller 2000 includes a control logic 2050 that drives buffers such as the buffers 1951*a-c* and 1952*a-c* and switching of drive control signals, DRIVE_IRQ_IN and DRIVE_IORDY_IN. The interface controller 2000 further includes an ATA/ATAPI converter 2030 that converts access requests of a central processing unit such as the central processing unit 1910 into access request in accordance with the ATAPI standard. An input/output unit 2040 may receive access signals and control signals from a central processing unit such as the central processing unit 1910 and provides these signals to either the control logic 2050 or the ATA/ATAPI converter 2030. The access signals from the central processing unit such as the central processing unit 1910 may be provided to the ATA/ATAPI converter 2030 which accesses the data storage drive such as the DVD drive 1930 via control signals lines A,RD,WR (A) and data signals lines D(A). Further, the ATA/ATAPI converter 2030 also generates a direction control signal BUF_DIR(A) that controls the direction of the data transfer by buffers such as the buffers 1951*b* and 1951*c*. When the central processing unit 1910 is an embedded SH3 processor, the DVD drive interrupt signal DRIVE_IRQ_IN is converted into an interrupt IRQ3 of the SH3 processor.

The ATA/ATAPI converter 2030 provides access to the ATA/ATAPI drive registers via a specific address space of the interface controller 2000. The specific address space may be mapped to the ATA/ATAPI drive registers. When a data processing device such as the central processing unit 1910 accesses this address space, the ATA/ATAPI converter 2030 transfers corresponding data to the ATAPI storage drive such as the DVD drive 1930. Within the interface controller 2000, switches 2020 and 2060 may be provided. The switches 2020 and 2060 may enable or disable transmission of an enabling control signal DBUF_EN(A) and DBUF_EN(B) to buffers, respectively. A host device such as the DVD decoding unit 1920 may generate the enabling control signals DBUF_EN(A) and DBUF_EN(B). The host device may control buffers provided on data signal lines of an ATA/ATAPI bus. Alternatively, or additionally, additional selector switches 2070 and 2080 may provide drive control signals DRIVE_IRQ_IN and DRIVE_IORDY_IN to either the auxiliary processing unit such as the DVD decoding unit 1920—as signals DRIVE_IRQ(B), DRIVE_IORDY(B)—or the ATA/ATAPI converter 2030.

The control logic 2050 controls buffers via signal lines BUF_EN(A) and BUF_EN(B). The control logic 2050 also controls the switches 2020, 2060 that enable control signals DBUF_EN(A) and DBUF_EN(B) and selector switches 2070, 2080 designating destination of drive control signals. The switches 2070 and 2080 may have various structures than the selector switches as long as they provide only one of the data processing devices with the drive control signals. For example, two switches may be used, instead of a selector switch. The two switches are connected to different data processing devices on one side and the switches may be jointly connected to the data storage drive on the other side. The control logic 2050 includes a register 2010. The central processing unit such as the central processing unit 1910 writes in the register 2010 data indicating which data processing device may access the data storage drive such as the DVD drive 1930. In accordance with the data written in the register 2010, the buffer control signals BUF_EN(A), BUF_EN(B) may be generated. Further, control signals for the switches 2020, 2060, 2070 and 2080 may be generated.

The interface controller 2000 may operate as follows. If the DVD decoding unit such as the decoding unit 1920 may be selected to access a DVD drive such as the DVD drive 1930, a switch operation may be initiated. The drive interrupt signal and the drive in/out ready signal are provided to the DVD decoding unit 1920 via the switches 2070 and 2080. Further, the switch 2060 does not transmit an enabling control signal DBUF_EN(A) from the ATA/ATAPI converter 2030 while an enabling control signal DBUF_EN(B) from the DVD decoding unit 1020 is transmitted via the switch 2020. The buffer control signal BUF_EN(B) is set so that a buffer such as the buffer 1952*a* is enabled to transfer data. Further, the buffer control signal BUF_EN(A) is also set so that the buffer such as the buffer 1951*a* is disabled. Alternatively, or additionally, when the central processing unit such as the central processing unit 1910 may be enabled to access the data storage drive such as the DVD drive 1930, the switches and buffer control signals above described may be operated in the other way, e.g., to disable the buffer 1952*a* and enable the buffer 1951*a*.

The information and/or entertainment system may include the data transfer interface for providing a plurality of data processing devices with an individual access to the data storage drive. Unlike computer systems having a single processor, an inexpensive auxiliary central processing unit may be used with the information and/or entertainment system. The auxiliary central processing unit may perform tasks such as accessing and decoding encoded video data. The central processing unit may be decoding devices that are commercially available at comparatively low price. The information and/or entertainment system may be cost-efficient. The central processing unit carries out data access operations for supplying data from the data storage drive to the auxiliary processing unit. The information and/or entertainment system may achieve high efficiency in utilizing processing resources. Each processing unit may individually access the data storage drive without wasting processing resources of the central processing unit. Thus, computation power requirements for the central processing unit may be lowered. A separate data storage drive is no longer required for each of the data processing units. As a result, the information and/or entertainment system may be cost-efficient and compact because a single data storage drive provides data storage facilities to each of plural data processing devices.

As noted above, the data transfer interface may be provided which enables access of a plurality of data processing devices to a single data storage drive. The data processing device comprises switch connected to each of the plurality of data processing devices and the data storage drive. Control controls the switch such that only a single one of the data processing devices accesses the data storage drive at a time. Each data processing device may individually access the data storage drive. In particular, a high processing efficiency of the data processing devices may be achieved because none of the data processing devices wastes processing resources for inefficient tasks such as transferring data between the data storage drive and another data processing device. The data transfer interface provides that an access of each data processing device to the data storage drive may be reliably carried out without an interference of signals from different data processing devices. In addition, control signals from the data storage drive interrupting the processing flow of a data processing unit are only provided to the data processing unit accessing the data storage drive. Thus, the data processing devices having no current access to the data storage drive may perform respective tasks without interruption.

While various embodiments of the invention have been described, it will be apparent to those of ordinary skill in the art that many more embodiments and implementations are possible within the scope of the invention. Accordingly, the invention is not to be restricted except in light of the attached claims and their quivalents.

What is claimed is:

1. A vehicle entertainment and information system having a data transfer interface system, comprising:
   a plurality of data processing devices having access to a single data storage drive installed in a restricted space of a vehicle and comprising a first data processing device assigned with a first individual number of transfer operations and a second data processing device assigned with a second individual number of transfer operations,
   where the first and the second data processing devices individually have the access to the single data storage drive one at a time via a single signal line and have no simultaneous access to the single data storage drive;
   where the first data processing device independently performs a first individual task and the second data processing independently performs a second individual task by individually accessing the single data storage drive;
   where the single data storage drive is initialized by resetting to an initial status to carry out the first individual task or the second individual task;
   an interface controller connected with the first and the second data processing devices;
   a first switch connected to the interface controller and the single data storage drive for permitting an access of the first data processing device to the single data storage drive;
   a second switch connected to the interface controller and the single data storage drive for permitting the access of the second data processing device to the single data storage drive;
   where both the first switch and the second switch are coupled to the single data storage drive via the single signal line and the first switch is disabled when the second switch is enabled;
   a detection unit operable to detect access status of the single data storage drive by detecting completion of the transfer operations by the plurality of data processing devices, or operation status of the single data storage drive; and
   where the interface controller comprises a control device that drives the first switch and the second switch to permit access to the data storage drive one at a time based on the access status of the single data storage drive, and the control device disables the first switch and activates the second switch upon determination that the first data processing device performs more than the first number of transfer operations.

2. The system of claim 1, where the first switch comprises a buffer for holding an access request from one of the plurality of data processing devices while the single data storage drive is being accessed.

3. The system of claim 1, where the control device disables the second switch and activates the first switch upon determination that the second data processing device performs more than the second individual number of transfer operations.

4. The system of claim 1, where the second switch comprises a buffer for holding data read from the single data storage drive and transmitted via the second switch while the single data storage drive is being accessed.

5. The system of claim 4, where the control device comprises a switch controller that drives the first and the second switches to connect the single data storage drive with the first and the second data processing devices.

6. The system of claim 1, where the interface controller further comprises a converter, and the first data processing device and the single data storage drive transfer data in accordance with an ATNATAPI standard and the converter converts the data according to the ATA/ATAPI standard.

7. The system of claim 5, where the interface controller is implemented with a field programmable gate array device comprising all hardware components of the data transfer interface except the first and the second switches.

8. The system of claim 2, where the buffer comprises an output enabling means connected to the switch controller, thereby to control a data output from the buffer.

9. The system of claim 1, where the first data processing unit comprises an integrated control unit for generating and outputting a designation signal to the interface controller which determines an access timing to the single data storage drive by the second data processing unit.

10. The system of claim 1, where the detection unit comprises a drive status detector that detects the operating status of the single data storage drive.

11. The system of claim 10, where the drive status detector is operable to detect a completion of a data transfer between the single data storage drive and a data processing device having a current access to the single data storage drive.

12. The system of claim 1, where the detection unit comprises a communication module operable to exchange control signals with one of the plurality of data processing devices having a current access to the single data storage drive.

13. The system of claim 1, where the detection unit transfers an access permission signal to one of the plurality of data processing devices generating an access request while the single data storage drive is being accessed.

14. The system of claim 1, where the detection unit is operable to provide an access termination signal to the second data processing device upon determination that the second data processing device has a current access to the data storage drive and the second data processing device terminates the current access to the data storage drive upon receipt of the access termination signal.

15. The system of claim 14, where the detection unit generates the access termination signal in response to an access request from the first data processing device when the second data processing device occupies the access to the single data storage drive over a predetermined time period.

16. The system of claim 1, where the detection unit comprises a drive status detector which receives an input/output ready signal of the single data storage drive and detects completion of a data transfer.

17. The system of claim 1, where a data transfer between the single data storage drive and one of the plurality of data processing devices requires initialization of the single data storage drive.

18. The system of claim 1, where the first data processing device comprises a central processing unit and the second data processing device comprises a DVD decoding unit.

19. The system of claim 18, where the single storage data drive comprises a DVD drive and the central processing unit and the DVD decoding unit read data stored in the DVD drive.

20. The system of claim 19, where the DVD decoding unit reads the data stored in the DVD drive after receiving an access permission signal from the detection unit without the data transfer operation by the central processing unit to the DVD decoding unit.

21. The system of claim 1 where the single data storage drive includes a magnetic disk drive.

22. The system of claim 1 where the single data storage drive includes a hard disk drive.

23. The system of claim 1 where the single data storage drive includes an optical disk drive.

24. The system of claim 1, where the single data storage drive includes a DVD drive.

25. The system of claim 24, where the second data processing device comprises a file navigation unit operable to navigate a DVD file.

26. A method for enabling an access of a plurality of data processing devices, comprising:
- installing a single data storage drive in a restricted space of a vehicle, the single data storage drive being accessible by the plurality of data processing devices one at a time via a single signal line where the plurality of data processing devices has no simultaneous access to the single data storage drive;
- where the plurality of data processing devices comprises a first data processing device and a second data processing device and the first data processing device independently performs a first individual task and the second data processing device independently performs a second individual task by individually accessing the single data storage drive;
- transferring an access request from the first data processing device having a first assigned number of transfer operations;
- receiving and analyzing a control signal representative of a current data transfer status from the single data storage drive,
- determining whether the second data processing device having the current access to the single data storage drive performs a data transfer operation over a second assigned number of transfer operations;
- upon determination that the second data processing device has the access to the single data storage drive over the second assigned number of transfer operations, activating and controlling a first switch to connect the first data processing device with the single data storage drive;
- disabling a second switch to disconnect the second data processing device from the single data storage drive;
- where both the first switch and the second switch cannot be simultaneously enabled; and
- terminating the access to the single data storage drive based on the current data transfer status and initializing the single data storage drive operable to reset the single data storage drive to an initial status lo carry out the first individual task or the second individual task.

27. The method of claim 26, further comprising transferring data between the first data processing device and the single data storage drive where transferring data comprises converting the data according to an ATAIATAPI standard.

28. The method of claim 27, where transferring data comprises reinitializing the data storage drive to prepare the data transfer according to the ATA/ATAPI standard.

29. The method of claim 26, further comprising:
selecting another data processing device upon completion of a predetermined number of transfer operations.

30. The method of claim 26, further comprising:
receiving the designation signal from the first data processing device;
selecting the second data processing device in accordance with the designation signal.

31. The method of claim 26, further comprising:
determining receipt of an access permission signal for the first data processing device, and
suspending access by the plurality of data processing devices other than the first data processing device, thereby avoiding an unnecessary access attempt.

32. The method of claim 26, further comprising:
Controlling a buffer to hold data read from the single data storage drive while the single data storage drive is being currently accessed and to transfer signals to one of the plurality of data processing devices waiting for the access when the current access to the single data storage drive is terminated.

33. The method of claim 26, further comprising:
Upon determination that the single data storage drive is being accessed, writing the access request into a predetermined address of a buffer which is connected to the single data storage drive and the plurality of data processing devices; and
Reading the access request from the buffer and transmitting the access request to the single data storage drive.

* * * * *